US012623802B2

(12) United States Patent
Meyhofer et al.

(10) Patent No.: US 12,623,802 B2
(45) Date of Patent: May 12, 2026

(54) FOOD ASSEMBLY AND PACKAGING ROBOT

(71) Applicant: Lab 37 LLC, Warrendale, PA (US)

(72) Inventors: Eric Meyhofer, Pittsburgh, PA (US); David Rice, Pittsburgh, PA (US); Paul Smith, Pittsburgh, PA (US); Chad Staller, Pittsburgh, PA (US); Andrew Chellman, Pittsburgh, PA (US); Robert Doll, Pittsburgh, PA (US); Wesly Rice, Pittsburgh, PA (US); Nick Letwin, Pittsburgh, PA (US); Francisco Robert, Santa Monica, CA (US); Vincent Perri, Weirton, WV (US); Neil Stegall, Pittsburgh, PA (US); Sean Hyde, Pittsburgh, PA (US); Morgan Jones, Pittsburgh, PA (US); Jason McMullan, Pittsburgh, PA (US); Daniel Tascione, Pittsburgh, PA (US); Julie Derence, Pittsburgh, PA (US); Roger Boulet, Harrisville, PA (US); Robert Russell, Pittsburgh, PA (US); Joe Zatta, Avella, PA (US)

(73) Assignee: Lab 37 LLC, Warrendale, PA (US)

( * ) Notice: Subject to any disclaimer, the term of this patent is extended or adjusted under 35 U.S.C. 154(b) by 50 days.

(21) Appl. No.: 18/897,936

(22) Filed: Sep. 26, 2024

(65) Prior Publication Data

US 2025/0100733 A1     Mar. 27, 2025

(51) Int. Cl.
B65B 43/54     (2006.01)
B65B 5/04     (2006.01)
(Continued)

(52) U.S. Cl.
CPC .............. B65B 43/54 (2013.01); B65B 5/045 (2013.01); B65B 7/2807 (2013.01);
(Continued)

(58) Field of Classification Search
CPC ..... B65B 2220/16; B65B 25/001; B65B 3/08; B65B 3/28; B65B 39/007; B65B 43/44;
(Continued)

(56) References Cited

U.S. PATENT DOCUMENTS 5,400,699 A     3/1995  Cailbault
8,034,390 B2    10/2011 Sus et al.
(Continued)

FOREIGN PATENT DOCUMENTS

EP          0642736 A1    3/1995
WO          97/14313 A1   4/1997
(Continued)

OTHER PUBLICATIONS https://www.youtube.com/watch?v=GiG6Kmz_FfE YouTube video titled "GoodBytz Robotic Kitchen", posted by goodBytz on Mar. 9, 2023 (Year: 2023).*
(Continued)

*Primary Examiner* — Himchan Song
(74) *Attorney, Agent, or Firm* — Lerner David LLP

(57)     ABSTRACT

The technology described herein is directed to a food assembly and packaging robot for automating aspects of food assembly and packaging. The food assembly and packaging robot system may include a robot system include a conveyance system, a bowl dispenser, one or more food dispensers, one or more condiment dispensers, a lidder, and a bagger, and in some instances, other components. The bowl dispenser may be configured to deposit bowls onto the conveyance system. The one or more food dispensers may be configured to deposit one or more ingredients into the
(Continued)

bowls and the one or more condiment dispensers may be configured to deposit one or more condiments into the bowls. The lidder may be configured to position lids atop the bowls and the bagger may be configured to place the bowls into bags.

20 Claims, 21 Drawing Sheets

(51) Int. Cl.

| | | |
|---|---|---|
| *B65B 7/28* | (2006.01) | |
| *B65B 39/00* | (2006.01) | |
| *B65B 57/00* | (2006.01) | |
| *B65B 61/26* | (2006.01) | |
| *B65G 21/20* | (2006.01) | |

(52) U.S. Cl.

CPC ............ *B65B 39/007* (2013.01); *B65B 57/00* (2013.01); *B65B 61/26* (2013.01); *B65G 21/2009* (2013.01); *B65B 2220/16* (2013.01)

(58) Field of Classification Search

CPC ......... B65B 43/54; B65B 43/56; B65B 5/045; B65B 57/00; B65B 57/06; B65B 57/12; B65B 57/145; B65B 57/18; B65B 59/001; B65B 59/02; B65B 59/04; B65B 61/20; B65B 61/26; B65B 63/08; B65B 65/003; B65B 65/02; B65B 7/2807; B65G 21/2009

See application file for complete search history.

(56) References Cited

U.S. PATENT DOCUMENTS

| | | | | |
|---|---|---|---|---|
| 11,610,276 | B1* | 3/2023 | Cohen .............. | G06Q 10/06316 |
| 2003/0054072 | A1 | 3/2003 | Merriman et al. | |
| 2010/0178401 | A1* | 7/2010 | Van Appeldoorn .... | A23B 2/103 |
| | | | | 53/471 |

| | | | | |
|---|---|---|---|---|
| 2015/0053097 | A1* | 2/2015 | Vardakostas ............ | A23P 20/20 |
| | | | | 99/450.4 |
| 2016/0213054 | A1* | 7/2016 | Vardakostas ............ | A23P 20/20 |
| 2016/0335833 | A1* | 11/2016 | Huang .................. | A47J 39/003 |
| 2018/0086537 | A1* | 3/2018 | Polak ................. | B65D 81/3484 |
| 2018/0127192 | A1* | 5/2018 | Cohen ..................... | G07F 11/68 |
| 2019/0261671 | A1* | 8/2019 | Vardakostas ............ | A23P 20/20 |
| 2020/0205461 | A1* | 7/2020 | Cohen ..................... | A23P 20/12 |
| 2020/0357220 | A1* | 11/2020 | Gauger ................. | B65B 25/001 |
| 2021/0022559 | A1 | 1/2021 | Zito et al. | |
| 2023/0075692 | A1* | 3/2023 | Hundley ............... | A47F 3/0408 |
| 2023/0251995 | A1* | 8/2023 | Procyshyn ............ | G06F 1/1696 |
| | | | | 235/375 |
| 2023/0303383 | A1* | 9/2023 | Callaghan ............ | B67D 1/1204 |
| 2023/0405834 | A1* | 12/2023 | Pashut .................. | B25J 19/023 |
| 2025/0057359 | A1* | 2/2025 | Wojtys ................. | G07F 11/165 |

FOREIGN PATENT DOCUMENTS

| | | |
|---|---|---|
| WO | 2018/165188 A1 | 9/2018 |
| WO | 2019/195315 A1 | 10/2019 |
| WO | 2023/049126 A1 | 3/2023 |

OTHER PUBLICATIONS

International Search Report including Written Opinion from PCT/US2024/048621, dated Feb. 13, 2025, pp. 1-8.
"Connected Robotics," webpage https://connected-robotics.com/en/, 3 pages, Apr. 8, 2023, retrieved from Internet Archive Wayback Machine https://web.archive.org/web/20230408165804/https://connected-robotics.com/en/ on Jan. 28, 2025.
"Remy by Cibotica," webpage https://connected-robotics.com/en/, 7 pages, Jul. 14, 2023, retrieved from Internet Archive Wayback Machine https://web.archive.org/web/20230714060633/https://cibotica.com/wp-content/uploads/2023/04/SPEC-SHEET-Remy-2023.pdf on Jan. 28, 2025.
"Xook: Resto From the Future," webpage https://xook.io/, 6 pages, Jun. 8, 2023, retrieved from Internet Archive Wayback Machine https://web.archive.org/web/20230608040456/https://xook.io/ on Jan. 28, 2025.

* cited by examiner

591

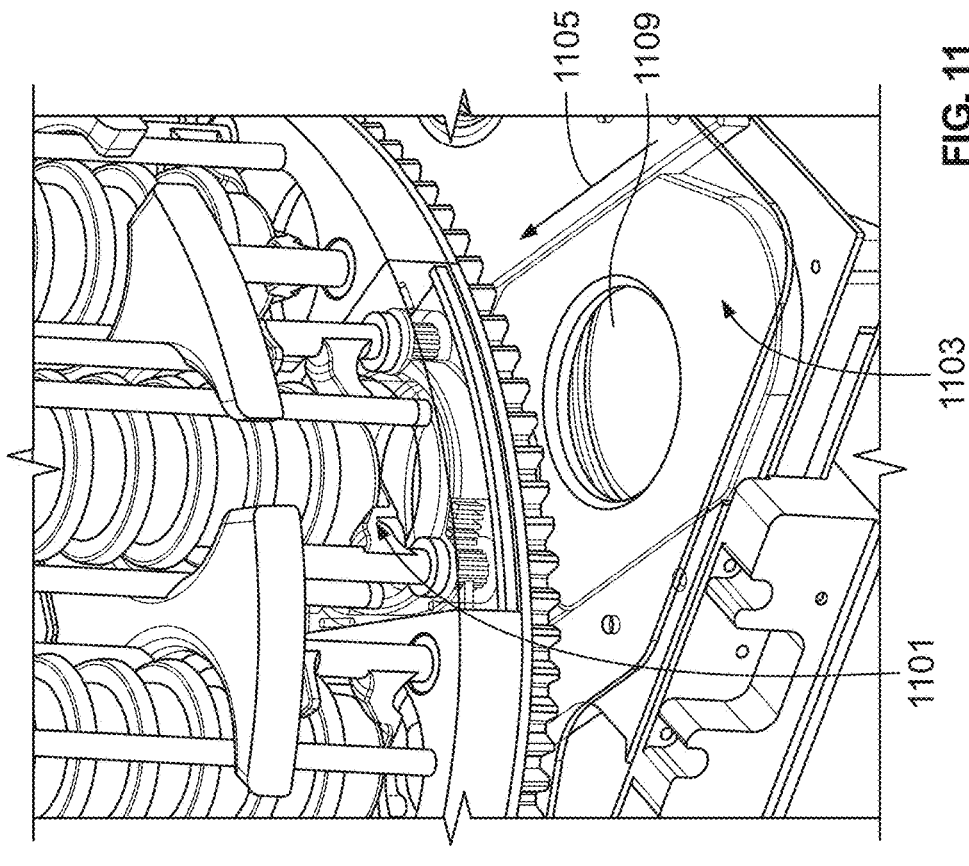
FIG. 11
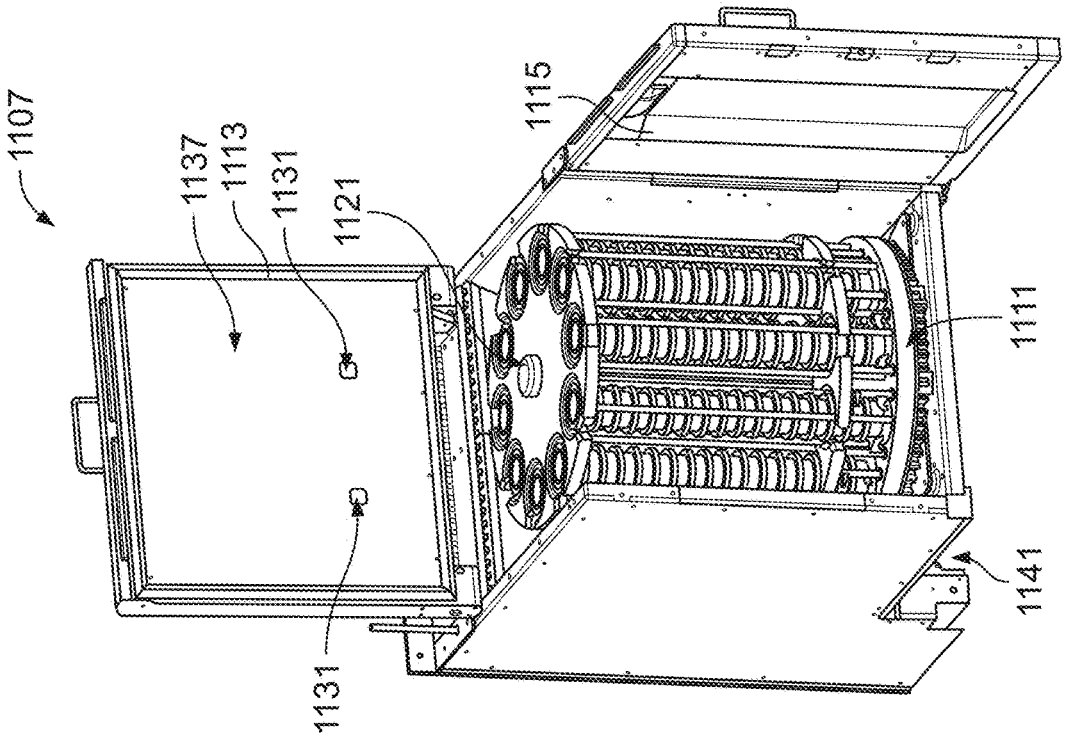

1221

1733

1731

1833

Controller

1820

Processor(s)

1835

Memory

1834

Instructions

1832

Data

1836

Communication Interface

FOOD ASSEMBLY AND PACKAGING ROBOT

CROSS-REFERENCE

The present application is a continuation of U.S. Patent Application No. 63/540,590, filed Sep. 26, 2023, the disclosure of which is hereby incorporated herein by reference.

BACKGROUND

Online ordering and delivery services have expanded the customer base of many restaurants and other such food suppliers. However, many restaurant kitchens are unable to handle the increase in orders that result from providing online ordering and/or partnering with delivery services. In this regard, kitchens are typically capable of handling food preparation for a set number of orders at a time, which is typically influenced by the size of the kitchen staff, food preparation space, and/or food storage space. Upticks in orders resulting from online orders and/or food delivery services may overwhelm kitchen staff, potentially causing order delays, incorrect order fulfillment, and missing orders. These issues may affect online and food delivery service orders, as well as orders placed by patrons within the restaurant.

Restaurants may address these issues by hiring more staff and expanding the size of food preparation and storage space. However, such solutions may require significant renovation costs or the need for a restaurant to move to a new location. Restaurants often need to close or reduce working hours during renovations or when moving to a new location, resulting in lost revenue.

BRIEF SUMMARY

The present disclosure provides for a food assembly and packaging robot for automating aspects of food assembly and packaging. By automating assembly and packaging, the workload on kitchen staff may be reduced and order issues, such as delays, incorrect order fulfillment, and missing orders may be minimized or avoided altogether.

One aspect of the disclosure is directed to a robotic system comprising: a conveyance system; a bowl dispenser configured to deposit bowls onto the conveyance system; one or more food dispensers configured to deposit one or more ingredients into the bowls; one or more condiment dispensers configured to deposit one or more condiments into the bowls; a lidder configured to position lids atop the bowls; and a bagger configured to place the bowls into bags.

In some instances, the conveyance system includes a plurality of magnetic carriages configured to be magnetically attached to a plurality of carrier sleds. In some examples, the plurality of magnetic carriages are configured to traverse a path through the robotic system such that the attached plurality of carrier sleds traverse the path. In some examples, each carrier sled of the plurality of carrier sleds includes an insert and is configured to receive a single bowl from the bowl dispenser. In some examples, each carrier sled of the plurality of carrier sleds includes a load cell configured to measure the weight of a bowl deposited within the respective carrier sled and wirelessly transmit the measured weight.

In some instances, the bowl dispenser is configured to deposit a single bowl onto the conveyance system at a time, wherein each of the single bowls is retrieved from a stack of bowls stored within the bowl dispenser. In some examples, the bowl dispenser includes a reader configured to receive weight measurements.

In some instances, each of the one or more food dispensers stores an ingredient within a hopper. In some examples, each of the one or more food dispensers are configured to maintain the one or more ingredients at preset temperatures within respective hoppers. In some examples, a first portion of the one or more food dispensers are connected to a chiller, steamer, and/or heater. In some examples, each of the one or more food dispensers include: one or more augers, and a hopper outlet, wherein the one or more augers direct the ingredient within the respective hopper out of the hopper through the hopper outlet into a bowl on the conveyance system.

In some instances, the one or more ingredients include singular foods or food preparations.

In some instances, the one or more condiment dispensers are configured to store condiments within cups and the cups are stored in columns, wherein each column stores a particular condiment type. In some examples, the columns form a carousel and condiments are deposited into bowls from the bottom of the columns through an actuator door. In some examples, the lidder stores a plurality of lids in a stack such that the top of the lid is facing downwards towards the conveyance system. In some examples, wherein the lidder comprises an end effector attached to an arm, wherein the end effector is configured to grasp a lid from a bottom of the stack and, wherein, after grasping the lid, the arm is configured to move the end effector downwards towards the conveyance system. In some examples, the arm is configured to rotate the end effector 180 degrees, such that the bottom of the top of the lid is facing upwards towards the stack of lids, and wherein the arm moves the end effector towards a bowl positioned on the conveyance system until the lid is on top of the bowl, whereupon the end effector is configured to release the lid.

In some instances, the bagger is configured to place bowls from the same order into a bag.

In some instances, the bagger is configured to seal and label bags. In some examples, the bagger is configured to place sealed and labeled bags onto a conveyor.

BRIEF DESCRIPTION OF THE DRAWINGS

FIG. 11 illustrates an example condiment dispenser, according to aspects of the disclosure.

Figure 1:
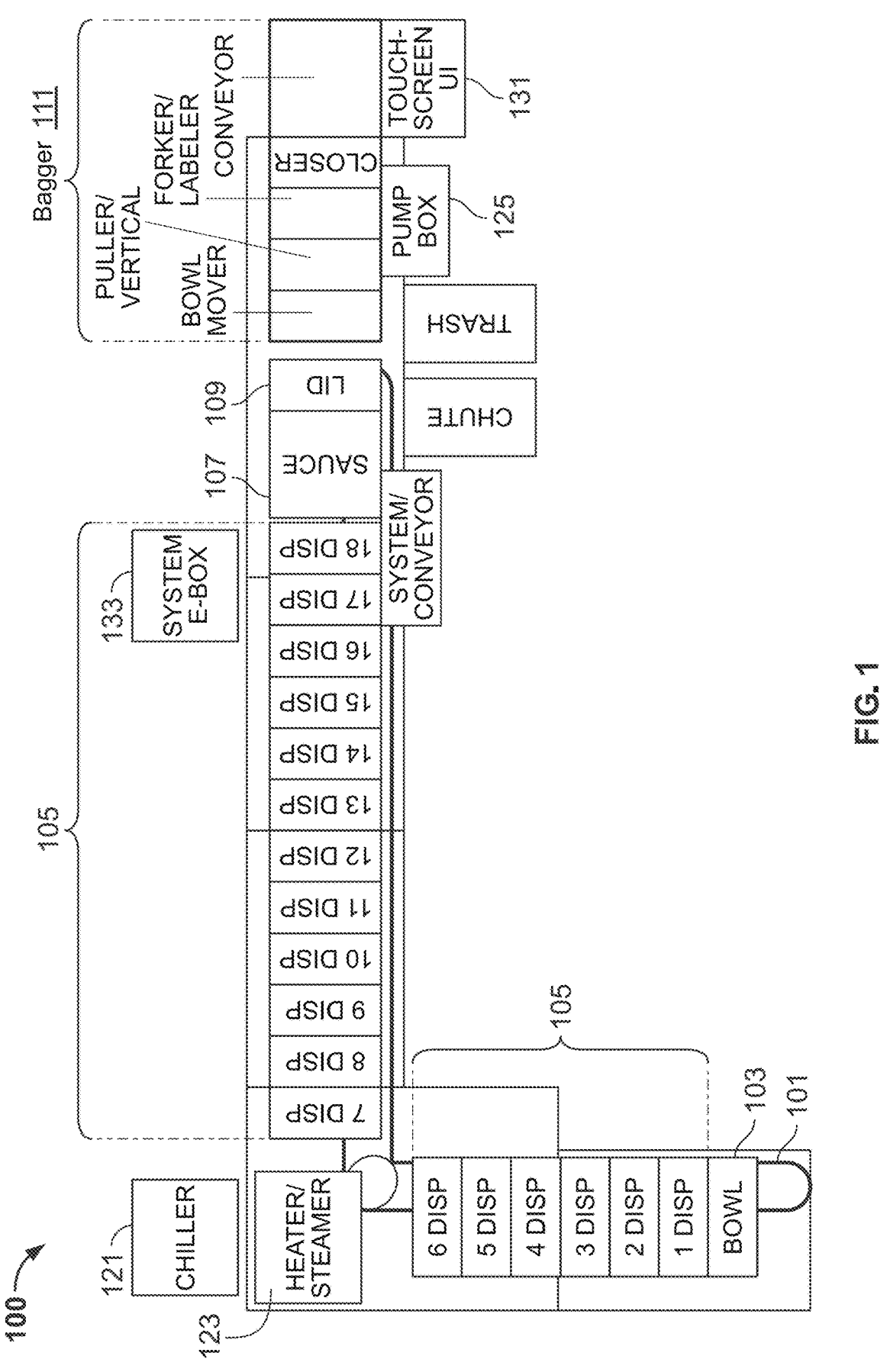
FIG. 1 illustrates an example robotic food assembly and packaging system, according to aspects of the disclosure.

The figures depict embodiments of the present disclosure for purposes of illustration only. Alternative embodiments of the structures and methods illustrated herein may be employed without departing from the principles or benefits described herein.

DETAILED DESCRIPTION

The technology described herein generally relates to a robotic food assembly and packaging system configured to assemble food products within bowls and package the bowls such that they can be sold and delivered to consumers upon demand. The food assembly and packaging system (referred to herein as the "robotic system") may include assembly equipment, including bowl dispensers, conveyors, food dispensers, condiment dispensers, and lidders, and packaging equipment, such as baggers. In operation, the robotic system may receive an order for one or more food bowls, with each order listing the food products to be included in each bowl, such as ingredients and condiments. The robotic system may then assemble each food bowl included in the order, place a lid on each bowl, and add each assembled food bowl to a bag for subsequent pickup or delivery.

The assembly equipment may perform the assembly of a food bowl order by the robotic system. Assembly may include dispensing, by a bowl dispenser, a bowl onto a carrier sled positioned on a conveyor. The conveyor may then transport the carrier sled holding the bowl to each food dispenser. Each food dispenser may deposit the ingredient stored therein into the bowl according to the ingredients listed in the order for the bowl. In this regard, food dispensers storing ingredients listed for the bowl may deposit the ingredient into the bowl, whereas food dispensers storing ingredients not listed would not deposit any ingredients into the bowl. After the food dispensers fill the bowl with the ingredients listed in the order, the conveyor may transport the carrier sled holding the bowl to the condiment dispenser. The condiment dispenser may deposit the condiments listed in the order into the bowl. After all of the food products listed in the order are deposited within the bowl, the conveyor may transport the carrier sled to the lidder, which may place a lid onto the bowl to secure the food products within the bowl.

The packaging equipment of the robotic system may perform the packaging of the completed bowls. In this regard, the bagger may move completed bowls for an order from the conveyor and place them into a bag. The bagger may seal the bag and convey the bag to a pickup location, such as a location outside of the kitchen, where a customer or delivery person may pick up the order.

Although the packaging and assembly equipment are discussed as separate portions of the robotic system herein, such distinction is merely for clarity and explanation. In this regard, packaging equipment may include components described as part of the assembly equipment and vice versa. For instance, the lidder, although described as part of the assembly equipment herein, may be considered part of the packaging equipment. Moreover, there may be no distinction between the packaging and assembly equipment, which may be regarded as a single unit.

As used herein, the term "ingredient(s)" may include a distinct food or food preparations containing more than one type of food. Moreover, ingredients may be raw or cooked foods. The term "condiment(s)" as used herein may include any type of food or food preparation typically provided as a supplement or add-on to another food or food preparation. For example, condiments may include salsa, ketchup, mustard, mayonnaise, sour cream, guacamole, sauces, garnishes, herbs, spices, and/or other such additions. It will be understood that any food may be considered a condiment and that all condiments are food. Thus, food dispersers may store and dispense condiments, and condiment dispensers may dispense any food product or food preparations.

Robotic System

FIG. 1 illustrates an example of a robotic system 100. Robotic system 100 includes a conveyance system 101, bowl dispenser 103, food dispensers 105, condiment dispenser 107, lidder 109, and bagger 111. The robotic system 100 also includes a chiller 121, heater/steamer 123, and pump 125. The robotic system 100 is controlled by a controller 133, which may be operated via interface 131.

Although robotic system 100 is shown as including a single conveyance system 101, a single bowl dispenser 103, eighteen food dispensers 105, a single condiment dispenser 107, a single lidder 109, and a single bagger 111, other robotic systems may include any number of these components. For instance, a robotic system may include multiple conveyance systems, bowl dispensers, condiment dispensers, food dispensers, lidders, and/or baggers. Moreover, robotic systems may include any number of supporting equipment, such as chillers, heaters, steamers, controllers, and interfaces. Moreover, the robotic system 100 may include other types of dispensers, such as other types of condiment dispensers and food dispensers. For instance, the robotic food system 100 may include a bun dispenser, meat press, deep fryer, etc.

During the operation of the robotic system 100, the controller 133 may receive an order for one or more food bowls. The orders may be "online orders," input remotely, such as through an app, website, kiosk, point of sale (POS) device, or "direct orders," entered directly into the robotic system 100 via interface 131. In this regard, orders taken at the same location as the robotic system 100, such as with a store where the robotic system 100 is positioned, may be considered "online orders," as they are not entered directly into interface 131. The controller 133 may issue instructions to the assembly and packaging equipment which the assembly and packaging equipment may execute to complete the received order. The controller may include software configured to determine which portions of an order the robotic system 100 can complete and which items in an order cannot be completed by the robotic system 100. For instance, an order may include orders for food bowls and other non-food bowl items. The controller 133 may determine the robotic system 100 can complete the food bowls and issue instructions to the assembly and packaging equipment to complete these portions of the order. The controller may ignore the non-food bowl items in the order or forward these items to another system or individual to complete those non-food bowl items of the order. In another example, the controller 133 may determine the robotic system 100 does not have the required ingredients to complete certain portions of the order. The controller 133 may ignore these portions of the order, issue an alert that these portions of the order cannot be completed, and/or forward these portions of the order to another system or individual to complete.

The instructions issued by the controller 133 may include instructing the bowl dispenser 103 to deposit a bowl for each item of the order onto the conveyance system 101. As described further herein, each bowl may be deposited onto a carrier sled which may include a scale to weigh each bowl as food and condiments are dispensed into it to ensure order accuracy.

The conveyance system 101 may transport the bowls and their respective carrier sleds to each food dispenser 105 and condiment dispenser 107. The food dispensers 105 and condiment dispenser 107 may be configured to hold the food at safe and preferred temperatures (hot or cold), as well as at certain humidity levels. Temperature and humidity levels within each of the food dispensers and condiment dispenser may be controlled by the chiller 121 and/or heater/steamer 123 described further herein. The temperature and/or humidity levels of the food dispensers 105 and condiments dispenser 107 may be set individually. For instance, one food dispenser may store hot food, and another food dispenser may store cold food. In some instances, the temperature and/or humidity levels of the food dispensers 105 and condiment dispenser 107 may be set or otherwise controlled by the controller 133.

When a bowl is transported to a food dispenser 105 storing an ingredient that is part of the order for that bowl, the food dispenser may deposit a predetermined amount of the stored ingredient into the bowl per instructions received from the controller. After the bowl is filled by the food dispensers with the ingredients listed in the order, the bowl may be transported by the conveyance system 101 to the condiment dispenser 107. The condiment dispenser 107 may deposit the condiments listed in the order into the bowl per instructions received from the controller. After the condiments and ingredients are deposited in the bowl, the conveyance system 101 may transport the bowl to a lidder 109, which may secure a lid onto the bowl. The lidder 109 may be instructed to place a lid on each bowl by the controller 133, or the lidder 109 may be configured to automatically place a lid on each bowl that is conveyed to it by the conveyance system 101.

The bagger 111, at the instruction of the controller 133 or automatically upon detecting a completed bowl, may place the completed bowl into a bag. For orders with multiple bowls, the bagger may place each bowl of the order into the bag (or multiple bags for larger orders.) The number of bags may be based on the number of bowls in the order. For instance, depending on the size of the bag, 2, 3, or more or fewer bowls may be placed in each bag. The number of bags may be determined by dividing the number of bowls in an order by the number of bowls that can be placed in a bag. The number of bowls in a bag may be evened out between the bags. For example, if bags can fit 3 bowls, and an order includes 4 bowls, the bagger may place 2 bowls in each bag, as In some instances, the bagger 111 may also label the bag to identify the food bowls and/or other information about the contents of the bag, such as the order ID, customer information, etc. Moreover, the bagger 111 may also be configured to deposit utensils or other add-ons, such as sides (e.g., fruit, bread, pita, etc.), condiment packets, etc., into the bag. The bagger 111 may seal the bag and convey the bag to a pickup location, such as a location outside of the kitchen, where a customer or delivery person may pick up the order.

Aspects of the operation of the robotic system 100 may be controlled via the interface 131. In this regard, an operator may view and modify the order queue, add orders manually, read and resolve errors, and view the status of components of the robotic system 100. Although not shown in FIG. 1, the robotic system 100 may include an alert system, such as a stack of lights to provide system visual operation status notifications. In some instances, the controller 133 may trigger alerts when errors with orders or the operation of the robotic system 100 are encountered. Such alerts may include lighting a light on the light stack, sounding an alarm, or sending a ticket outlining the error to a ticketing system.

To ensure customer and operator safety, the robotic system 100 may be configured to comply with applicable National Sanitation Foundation sanitary design standards as well as applicable UL and NEC electrical and operator safety standards.

Conveyance System

Figures 2A, 2B:
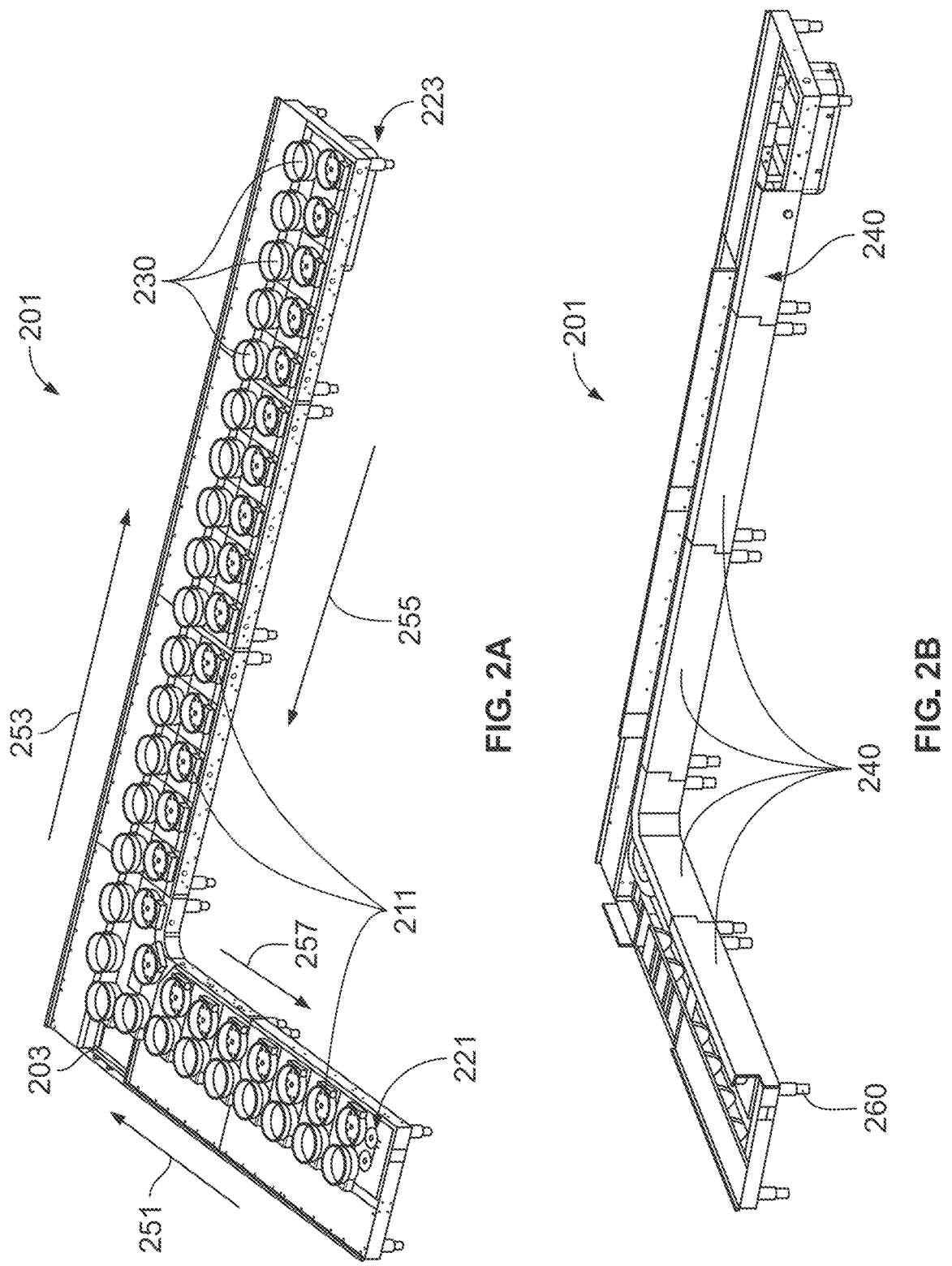
FIGS. 2A and 2B illustrate an example conveyance system, according to aspects of the disclosure.

FIGS. 2A and 2B are schematics of an example conveyance system 201 which may be compared with conveyance system 101. As shown, FIG. 2A, the conveyance system 201 includes a low-friction plastic surface 203, on which carrier sleds 211 are transported. For clarity, only a few carrier sleds are labeled in FIG. 2A. In some instances, the surface on which the carrier sleds 211 are transported may be other materials, such as metal, glass, or other low-friction surfaces.

The conveyance system 201 may include magnetic carriages positioned under each of the carrier sleds 211. The carrier sleds 211 may be magnetically coupled to the magnetic carriages underneath. The carriages may be attached to roller chain 221, or other such chains, rope, belt, etc. The roller chain 221 may be driven by a motor, such as stepper motor 223.

Figure 2C:
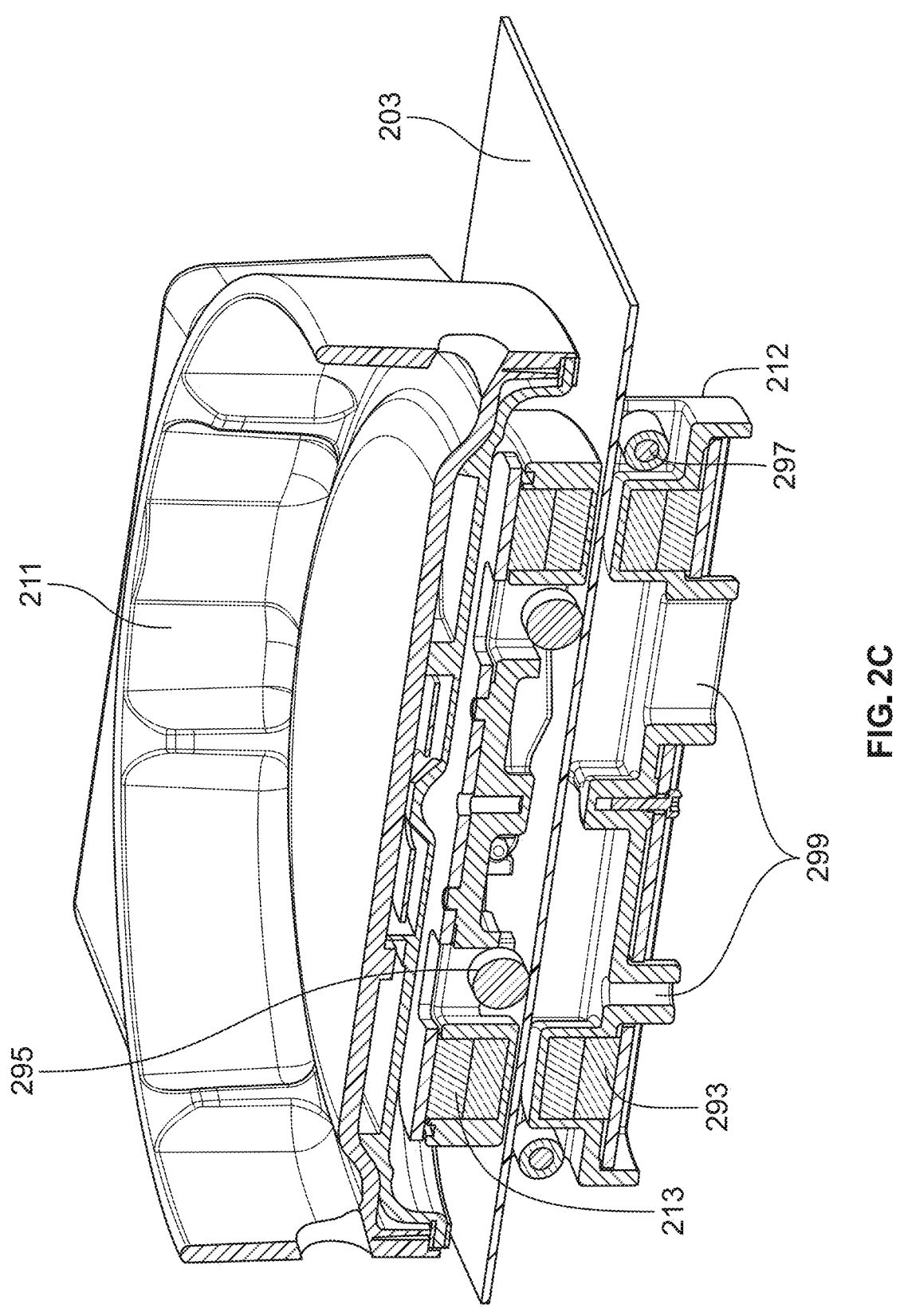
FIG. 2C illustrates a cutaway view of an example carrier sled and carriage, according to aspects of the disclosure.

FIG. 2C illustrates a cutaway view of a magnetic carriage 212 coupled to a carrier sled 291, which may be compared to carrier sleds 211. As shown, magnets 213 within the carrier sled 211 are coupled with magnets 293 within the carrier sled 291 via a magnetic force. The magnetic force couples the magnetic carriage 212 and the carrier sled 291 through the low-friction plastic surface 203. Roller wheels 295 of the carrier sled 291 and roller wheels 297 of the magnetic carrier 212 may allow the carrier sled 291 and magnetic carrier 212 to traverse a path along the conveyance system as the magnetic carriage 212 is pushed, pulled, or otherwise guided along the conveyance system 201 by the roller chain 221. In this regard, and as further shown in FIG. 2C, the magnetic carriage is connected to the roller chain at roller chain connection points 299.

During operation, the motor 223 may drive the roller chain 221, such that the attached magnetic carriages travel a preset path around the conveyance system. The preset path may be in any direction, but the path for conveyance system 201 is illustrated by arrows 251-257. Guides, sprockets, and other such components may guide the roller chain 221 along the preset path. As the magnetic carriages move along the preset path, the carrier sleds 211 may move in unison with the magnetic carriages to which they are coupled. The preset path may direct the carrier sleds 211 and bowls placed therein, such as bowls 230, to the assembly and packaging equipment. The packaging equipment (e.g., bagger) may remove bowls from the carrier sleds 211, as explained herein.

By maintaining the magnetic carriages, roller chain 221, motor 223, and other components of the conveyance system below the low-friction surface 203, a sanitary food environment may be maintained above the low-friction surface 203. In some instances, the magnetic carriages, roller chain 221, motor 223, and other components of the conveyance system 201, such as the guides, sprockets, etc., may be enclosed below the low-friction surface 203. Moreover, by maintaining the carrier sleds 211 above the low-friction surface 203, the carrier sleds 211 are easily removable for cleaning the conveyance surface and the carrier sleds 211 themselves. Positioning the components of the conveyance system below the low-friction surface 203 protects the components of the conveyance system from being dirtied by food items and other objects which could hinder the operation of the conveyance system. The magnetic coupling between the carrier sleds 211 and the magnetic carriages may have a low break-away force to reduce the risk of a pinch/entanglement hazard.

As shown in FIG. 2B, the conveyance system 201 may include a stand structure 260 to support and house the components of the conveyance system 201 described above with regard to FIG. 2A. The stand structure may include safety guards 240, shown in FIG. 2B, but removed in FIG. 2A for clarity. If a guard is removed during operation of the conveyance system 201, the packaging and/or assembly equipment may be disabled for safety and a notification, such as an alert to an operator may be generated. The stand structure 260 provides standardized mounting provisions for the components of the conveyance system 201 and may further support some or all of the packaging and assembly equipment. By standardizing the stand structure 260, different arrangements of components and easier integration of new component types (e.g., new food/condiment dispensers) may be easily performed. In some instances, the stand may be set at a low fixed height, such as six inches or more or less off of the platform (e.g., floor) on which it is positioned for ergonomic refilling of food dispensers and to provide underside cleaning access. In some instances, the stand may be adjustable to allow for a selection of heights, such as zero inches to two or more feet from the platform on which the stand is positioned.

Carrier Sled

Figures 3A, 3B:
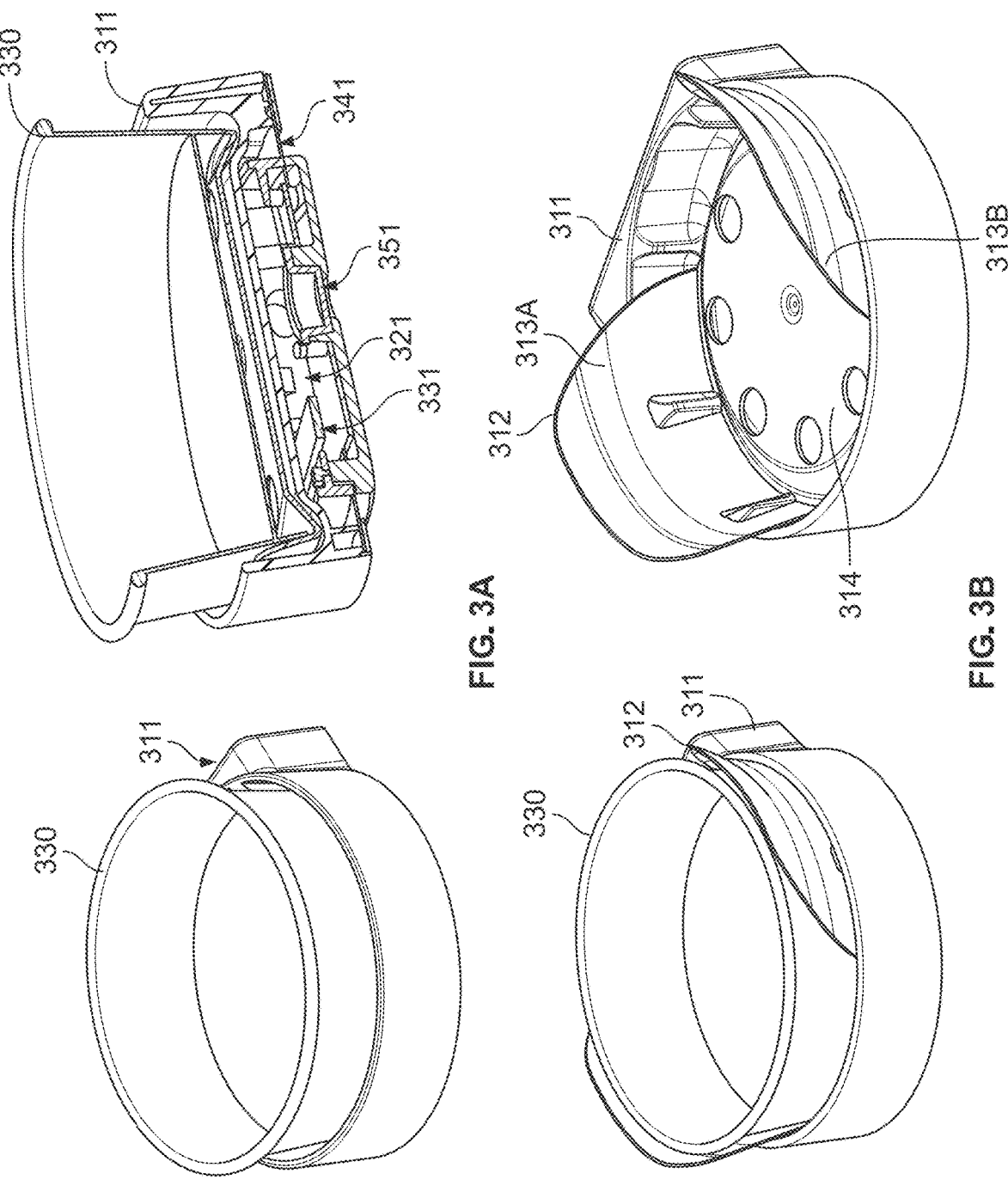
FIG. 3A illustrates an example carrier sled, according to aspects of the disclosure.
FIG. 3B illustrates an example carrier sled having an insert, according to aspects of the disclosure.

Carrier sleds may be configured to hold, transport, and weigh food bowls, such as bowl 330, as they are conveyed to the packaging and assembly equipment by the conveyance system 201. FIG. 3A illustrates an example carrier sled 311, which may be compared with carrier sleds 211. Carrier sled 311 includes a load cell 321, configured to measure the weight of the bowl and its contents. A transmitter (not shown) within, or otherwise attached to, the carrier sled 311 may wirelessly transmit the measurements made by the load cell 321 to readers connected to or otherwise integrated with the food and condiment dispensers, such as food dispensers 105 and condiment dispenser 107. The carrier sleds may use NFC devices for power and communication. As described further herein, the dispensers and other devices in the robotic system may have readers which provide power and/or communicate with the NFC device of the carrier sleds.

In some instances, the measurements may be reported to the bowl dispenser, such as bowl dispenser 103, a lidder, such as lidder 109, and a bagger, such as bagger 111. These measurements by the load cell 321 may be used to detect the presence of a bowl dispensed by the bowl dispenser, measure food and condiment item serving size, confirm lid application by the lidder, and check for removal of the bowl from the carrier sled 311 by the bagger's bowl mover.

For instance, before, during, and/or after food is deposited by a food dispenser into a bowl positioned within carrier sled 311, the load cell 321 may send measured weight(s) to a reader of the food dispenser, described further herein. The measured weight(s) sent to the food dispenser may correspond to the weight of the food deposited or the total weight of the bowl. Based on the received weight(s), the food dispenser may determine whether the proper amount of food has been deposited. For instance, when the carrier sled 311 is positioned below the food dispenser, the reader of the food dispenser may read the current weight of the bowl from the transmitter of the carrier sled. The food dispenser may then receive additional weight measurements when dispensing food until the weight of the bowl is increased a set amount, indicating sufficient food has been dispensed. The set amount may be preset for each ingredient and portion size. For instance, a preset amount for a single portion may be X weight, whereas a preset amount for a double or triple portion may be 2× and 3×, respectively. In some instances, X may be a weight range. The food dispenser may send a confirmation signal to the controller when the correct amount of food has been deposited. The food dispenser may send trigger an alarm and/or send an error signal to the controller when the incorrect amount of food has been deposited. In response, the controller can issue an alarm or other such message indicating the order is not correctly filled. Moreover, in response to receiving an error signal indicating the incorrect amount of food has been deposited into a bowl by a dispenser, the controller may instruct subsequent dispensers and handling equipment to bypass the order associated with the bowl having the incorrect amount of food, thereby limiting waste by continuing to fill an incorrectly prepared order and providing the opportunity for human intervention to correct the order.

In another example, the lidder may receive the weight measured by a load cell when of a bowl arrives and then after the lidder adds a lid. If the change in weight between the two measurements matches the weight of a lid, the lidder may determine the lid has been successfully placed. The lidder may transmit a message to the controller indicating the lid has been successfully placed. If the change in weight does not match a lid, the lidder may transmit a message to the controller indicating that there is a potential issues, such as no lid being placed or multiple lids being placed.

Similarly, the bagger may receive the weight measured by a load cell when of a bowl arrives and then after the bagger lifts the bowl off of the carrier sled. If the change in weight between the two measurements matches the weight of the bowl, the bagger may determine the bowl has been successfully lifted. The bagger may transmit a message to the controller indicating the bowl has been successfully lifted. If the change in weight does not match the weight of the bowl, the bagger may transmit a message to the controller indicating that there is a potential issues, such as the bowl not being lifted or the bowl being lifted but contents therein being left behind.

In some instances, a carrier sled 311 may include an insert 312, as shown in FIG. 3B. As shown in FIG. 3B, the insert 312 may include sloping sides 313A and 313B and a base 314. Although FIG. 3B illustrates two sloping sides 313A, 313B positioned on opposite sides of the insert 312, an insert may include any number of sloping sides positioned at any location around the base 314. The base 314 may rest on the interior of the carrier sled 311. The insert 312 may ensure bowls, such as bowl 330, and lids placed on bowls by the lidder, discussed further herein, are properly aligned when they are placed in the carrier sled 311. In this regard, the sloping sides 313A and 313B may guide a bowl (or lid) into the center of the carrier sled towards the base. As such, if bowls or lids are initially placed slightly off-center of the carrier sled 311, the insert 312 may direct the bowls or lids towards the center of the carrier sled 311.

Additionally, the presence of the bowl 330 at each reader location (e.g., at each the bowl dispenser, food dispenser, condiment dispenser, lidder, and/or bagger), which may be determined by the weight measured by the load cell 321, may be used to verify that there hasn't been a derailment of the carrier sled 311 and that the carrier sled 311 is functioning properly. In the event a malfunction is detected, the malfunction may be reported to a controller, such as controller 133, which may take action, such as stopping the robotic system or generating a notification or other such alert.

Carrier sled 311 further includes a magnetic backer 331 attaching to a magnetic carrier, as described further herein. The magnetic backer 331 bridges the north pole of one magnet with the south pole of a second magnet, thereby increasing the total magnetic force of the magnets. In some instances, two magnets may be connected via the backer on the carrier sled, and a corresponding two magnets may connected via the backer at each sled location on the conveyor.

The carrier sled 331 may be sealed by a flexible seal 341 to allow for cleaning without risk of water damage to the interior components, such as the load cell. Further, the carrier sled 331 may include a vent membrane 351. Vent membrane 351 may use a PTFE membrane to vent air for improved weighing accuracy while repelling water/debris ingress.

Bowl Dispenser

Figure 4:
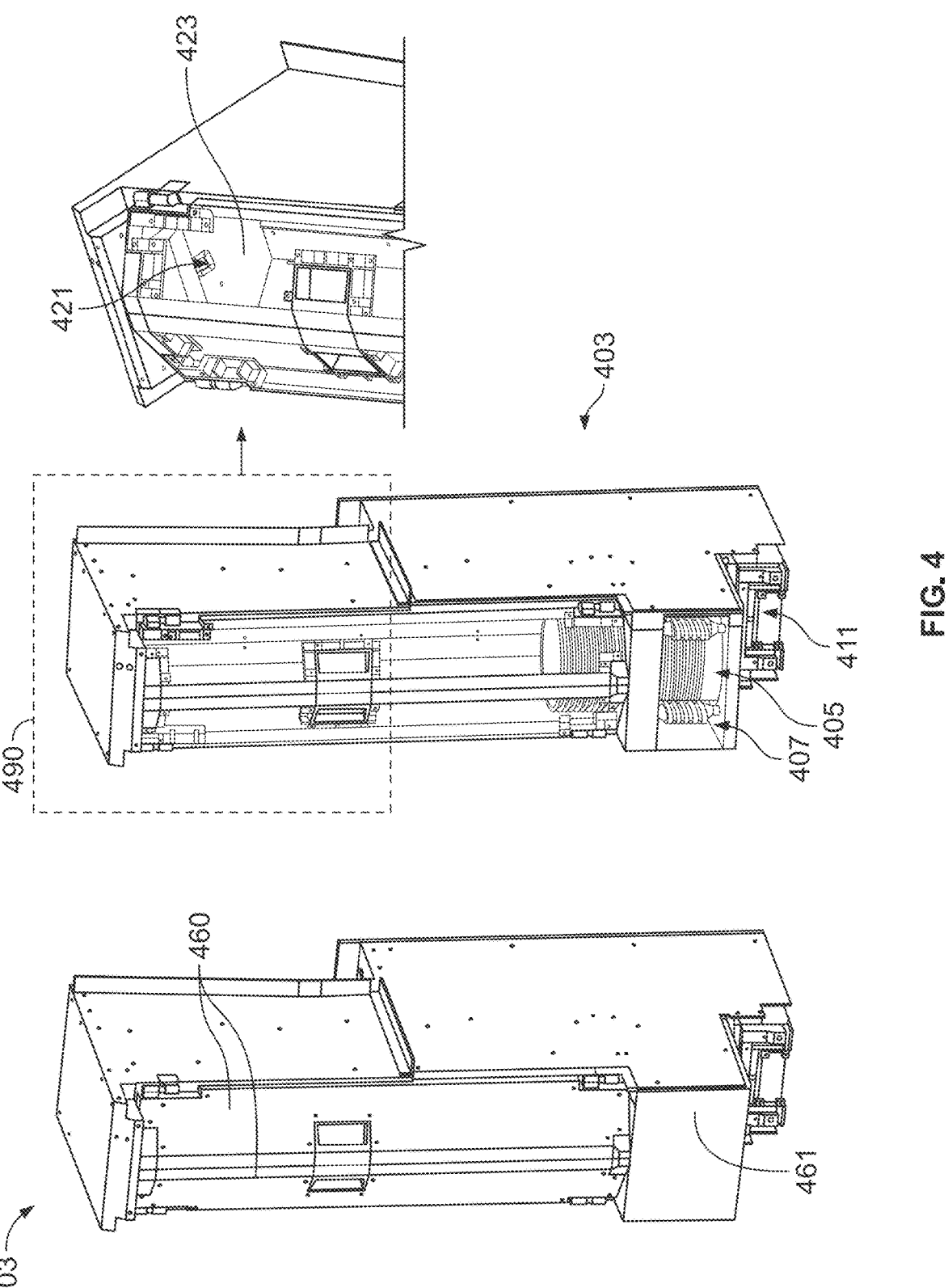
FIG. 4 illustrates an example bowl dispenser, according to aspects of the disclosure.

Bowl dispenser may be configured to hold one or more stacks of bowls and dispense the bowls into carrier sleds. FIG. 4 illustrates an example bowl dispenser 403, which may be compared to bowl dispenser 103. A stack of bowl 405 is stored in the interior of the bowl dispenser 403. The bowls in the stack of bowls 405 may be separated and dispensed from the bottom of the stack with a helical screw mechanism 407 onto a carrier sled. The bowl dispenser 403 may be refilled by opening doors 460. For clarity, the center illustration of FIG. 4 illustrates the doors 460 and front cover 461 as opaque so the internals of the bowl dispenser can be seen. When a door 460 of the dispenser is open, as detected by a switch or sensor, the dispenser's motion may be disabled for safety.

The height of the stack of bowls, which corresponds to the number of bowls available within the bowl dispenser 403, may be measured with a sensor, such as non-contact time-of-flight (TOF) infra-red (IR) sensor 421, or other such sensors which can measure distance. As shown in the alternative view of the upper portion 490 of the bowl dispenser, the TOF IR sensor 421 is positioned on the underside of the top plate 423. Although bowl dispenser 403 shows a TOF IR sensor 421 positioned on the underside of the lid, other sensors configured to determine a height of a stack of bowls and/or otherwise detect the number of bowls present in the bow dispenser 403 may be positioned on the underside of the lid or elsewhere. Moreover, more than one sensor may be used. The measurements from the TOF IR sensor 421 may be reported to the controller 133 and or operator via an interface, such as interface 131. In some instances, the controller may generate an alert when the number of lids is below a threshold number.

The bowl dispenser may include a reader configured to communicate with the carrier sleds, such as carrier sled 331, to check for the presence of the carrier sled and/or confirm that a bowl was dispensed by reading the weight from the carrier sled. The reader may be a near-field communication (NFC) reader. As shown in FIG. 4, an NFC reader 411 is positioned at the base of the bowl dispenser. However, readers may be positioned elsewhere on (or near) the bowl dispenser within reading distance of the carrier sled.

Food Dispenser

Figure 5:
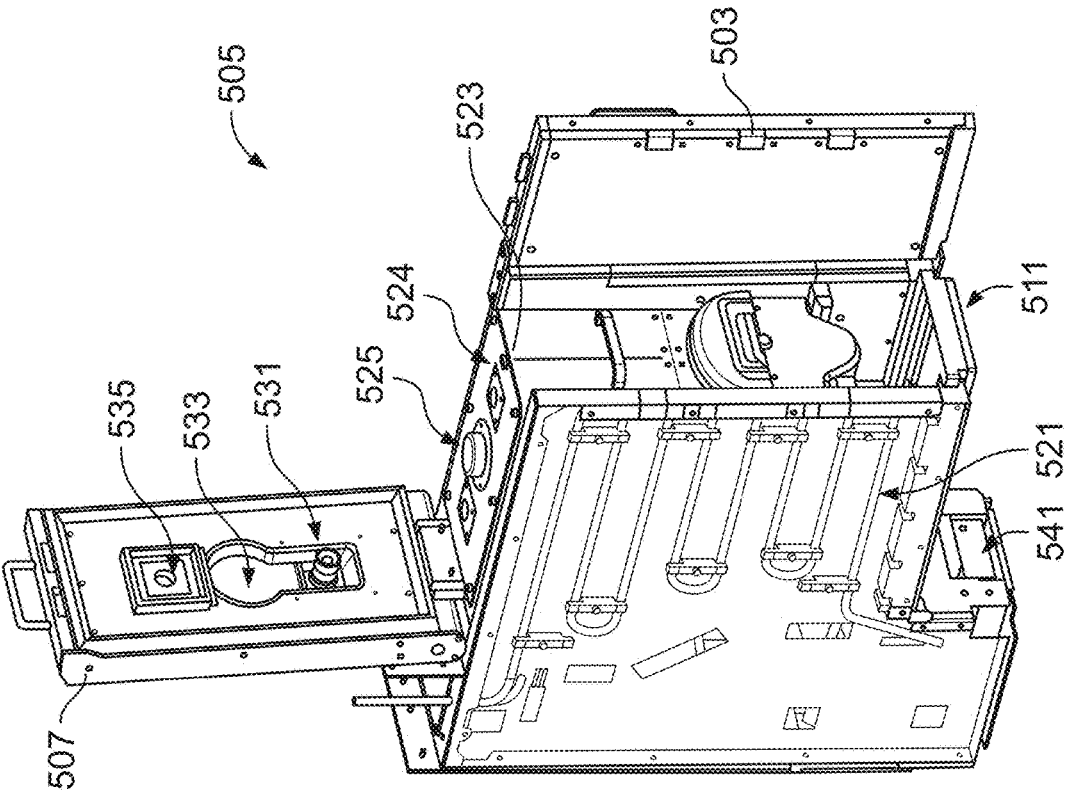
FIG. 5 illustrates an example food dispenser, according to aspects of the disclosure.
Figure 5:
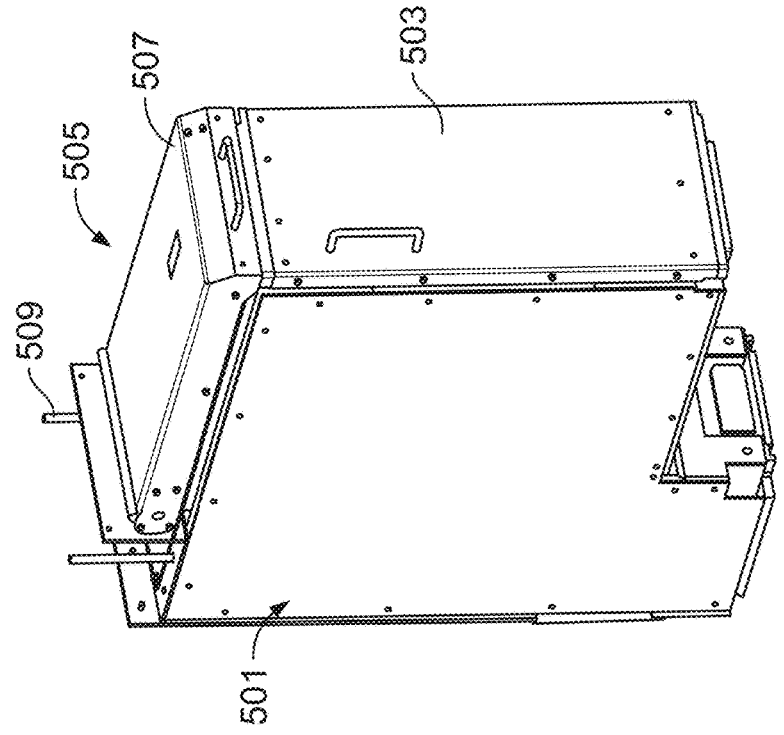

The food dispensers each hold a quantity of an ingredient that can be deposited into the bowls. An example food dispenser 505 is shown in FIG. 5. As shown, the food dispenser 505 includes a housing 501 including an access door 503 and an upper access door 507, and a lower drip tray 511. Within the interior of the housing 501 (illustrated within the figure on the right where the access door 503 and upper access door 507 are open, and the walls of the housing are transparent,) are heat transfer tubing 521, a hopper 523, and a food temperature probe 525. A steam bellows cup 531, NFC reader 533, and IR height sensor 535 are mounted to the upper access door 507. An NFC reader 541 is positioned on the base of the housing.

The heat transfer tubing 521 may run along the exterior of the wall of the food dispenser 505 to heat and/or cool the ingredients stored within the hopper 523. In this regard, a heated or cooled material, such as water, propylene glycol, or other such material may circulate through the tubing. The heated or cooled material may be provided from a heating and/or cooling system, such as chiller 121 or heater/steamer 123. The flow of material may be controlled via valves on the inlet and outlet to adjust the temperature within the food dispenser. For instance, by adjusting the positioning of the valves, the flow rate of the material may be adjusted, thereby reducing or increasing the temperature. Although heat transfer tubing 521 is shown on only one side of the food dispenser, heat transfer tubing 521 may be on any side of the food dispenser 505.

As further shown in FIG. 5, steam tubing 509 may be routed from the top of the food dispenser 505 through the upper access door 507. The steam tubing 509 may be connected to the steam bellows cup 31. Although not shown, the upper access door 507 may include an internal path for steam tubing. The steam bellows cup 531 may be configured to allow steam to directly enter the hopper where the food is held. The sensor 535 positioned in the upper access door 507 may be a non-contact TOF IR sensor to measure the ingredient level in the hopper. The NFC reader 533 positioned in the upper access door 507 may be configured to read the output of the temperature by the food temperature probe 525.

Figure 6:
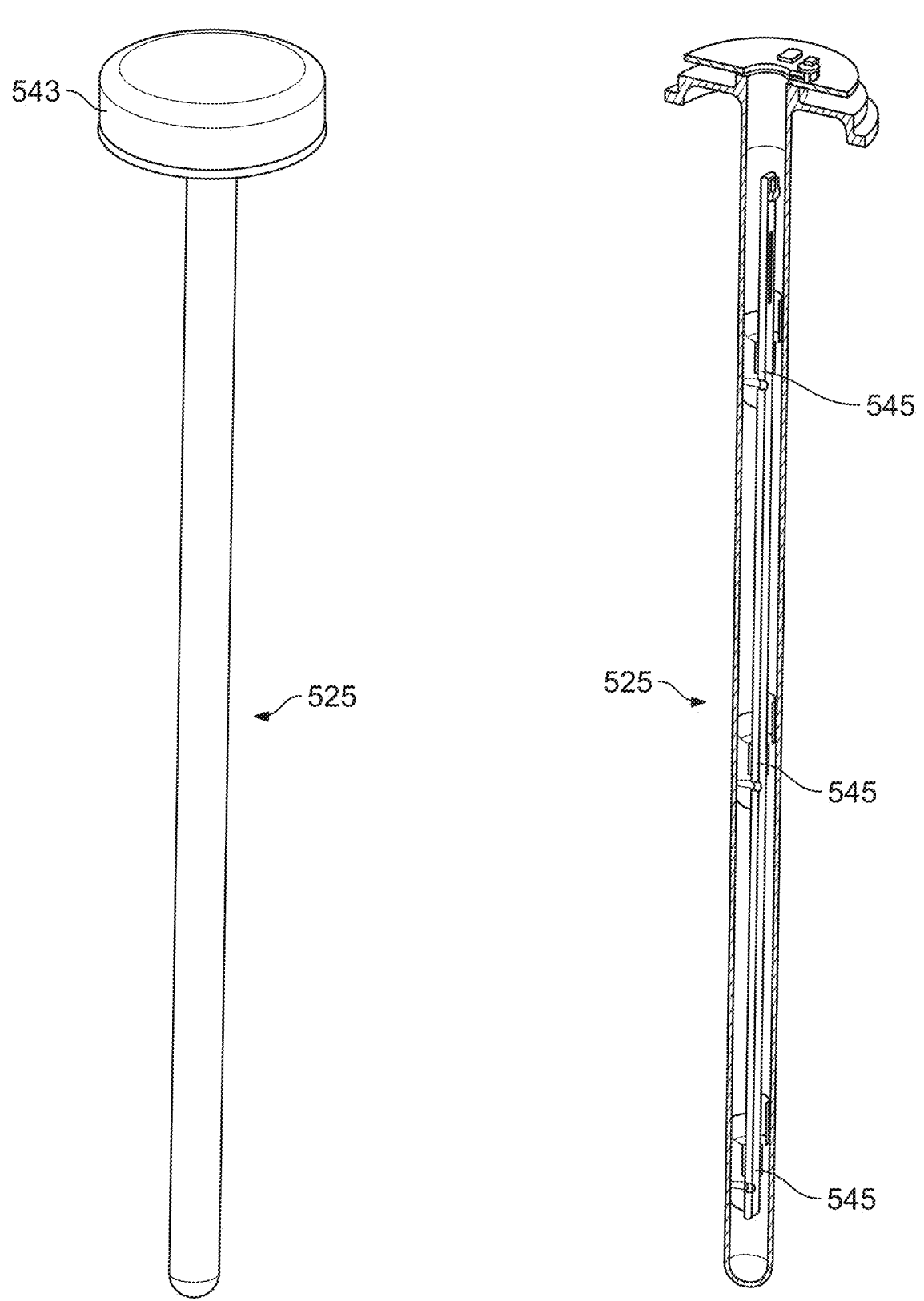
FIG. 6 illustrates an example probe, according to aspects of the disclosure.

As further illustrated in FIG. 5, the temperature probe 525 may be inserted through and supported by the hopper lid 524. The temperature probe 525 measures the food temperature at three locations, using three sensor points 545, illustrated in FIG. 6. By taking measurements at three locations within the ingredients in the hopper, the temperature probe 525 may capture an accurate temperature of the ingredients. In some embodiments, temperature probes having one, two, four, or more sensor points may be used.

The temperature readings may be collected via an NFC reader in the dispenser housing lid. If the temperature reading falls outside the appropriate range, the operator may be notified and/or a signal may be sent to the controller, which in turn may generate an alert or other notification. If the reading is out of range for a certain time, the dispenser may be shut off and the ingredient stored therein deactivated from the menu to protect food safety. The temperature probe 525 may include a waterproof, sealed cover 543 that protects the internals of the temperature probe. Thus, the temperature probe 525 may be dishwasher safe. Further, the temperature probe 525 can be removed from the hopper and positioned in other hoppers or reinserted back into the same hopper.

Figure 7:
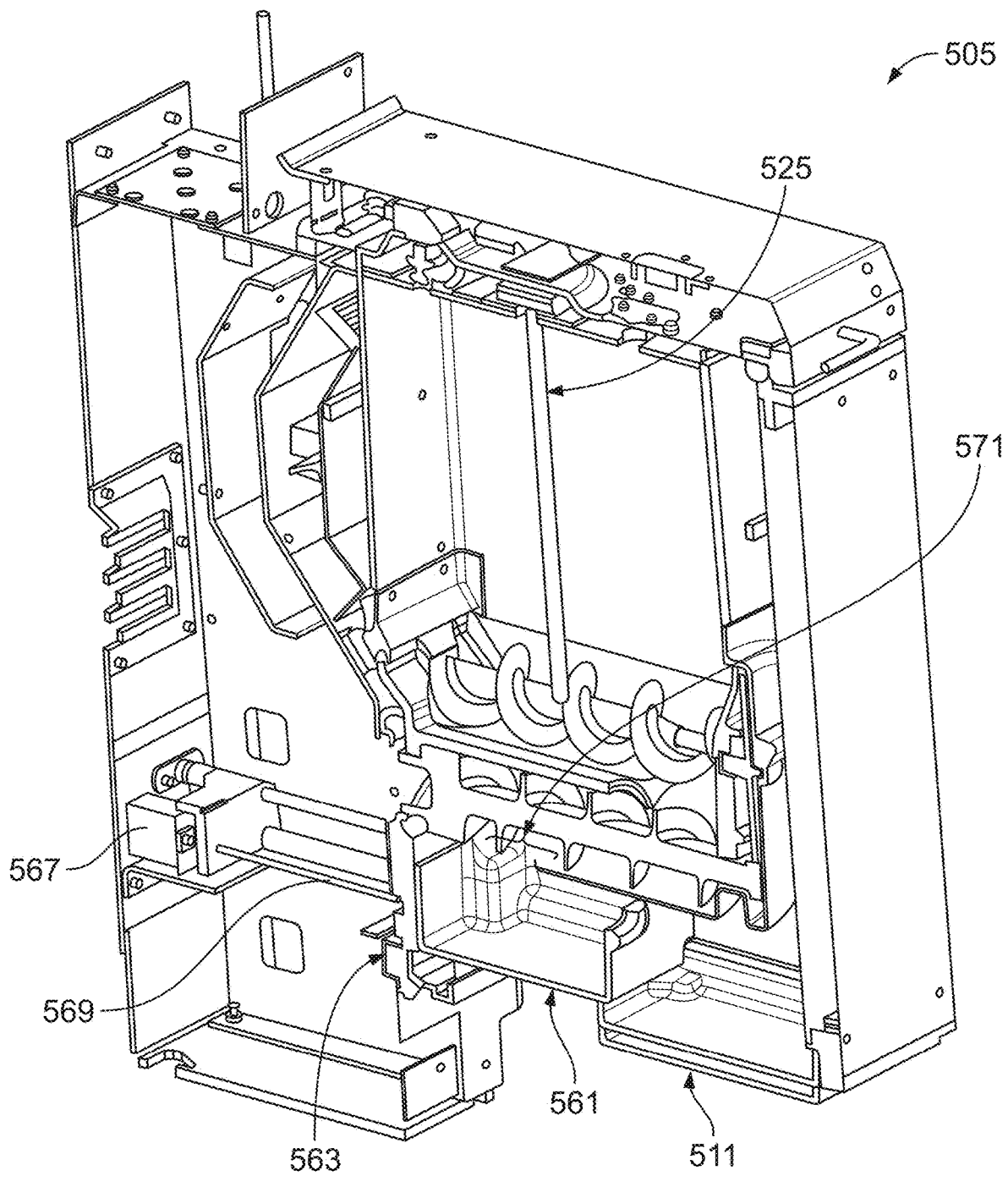
FIG. 7 illustrates a cutaway view of an example food dispenser, according to aspects of the disclosure.

A cutaway view of the food dispenser 505 is illustrated in FIG. 7. As shown, the internal portion of the food dispenser 505 includes an upper drip tray 561, the lower drip tray 511, a hopper outlet 571, and a motor 567 for guiding the upper drip tray 561 along guides 569. The upper drip tray 561 is positioned below the hopper outlet 571 and may be moved by motor 567 toward the back wall of the food dispenser along the guides 569 so that food may be dispensed into bowls positioned by the conveyance system under the food dispenser 505. Any overflow from the upper drip tray 561 may be caught by the lower drip tray 511. A sensor 563, such as a capacitive sensor, may monitor for liquid sitting in the lower drip tray. If the liquid level is approaching full, the food dispenser 505 may notify an operator or controller and/or the operation of the food dispenser 505 may be paused to prevent overflow and contamination from entering bowls positioned below the food dispenser 505.

Figures 8A, 8B:
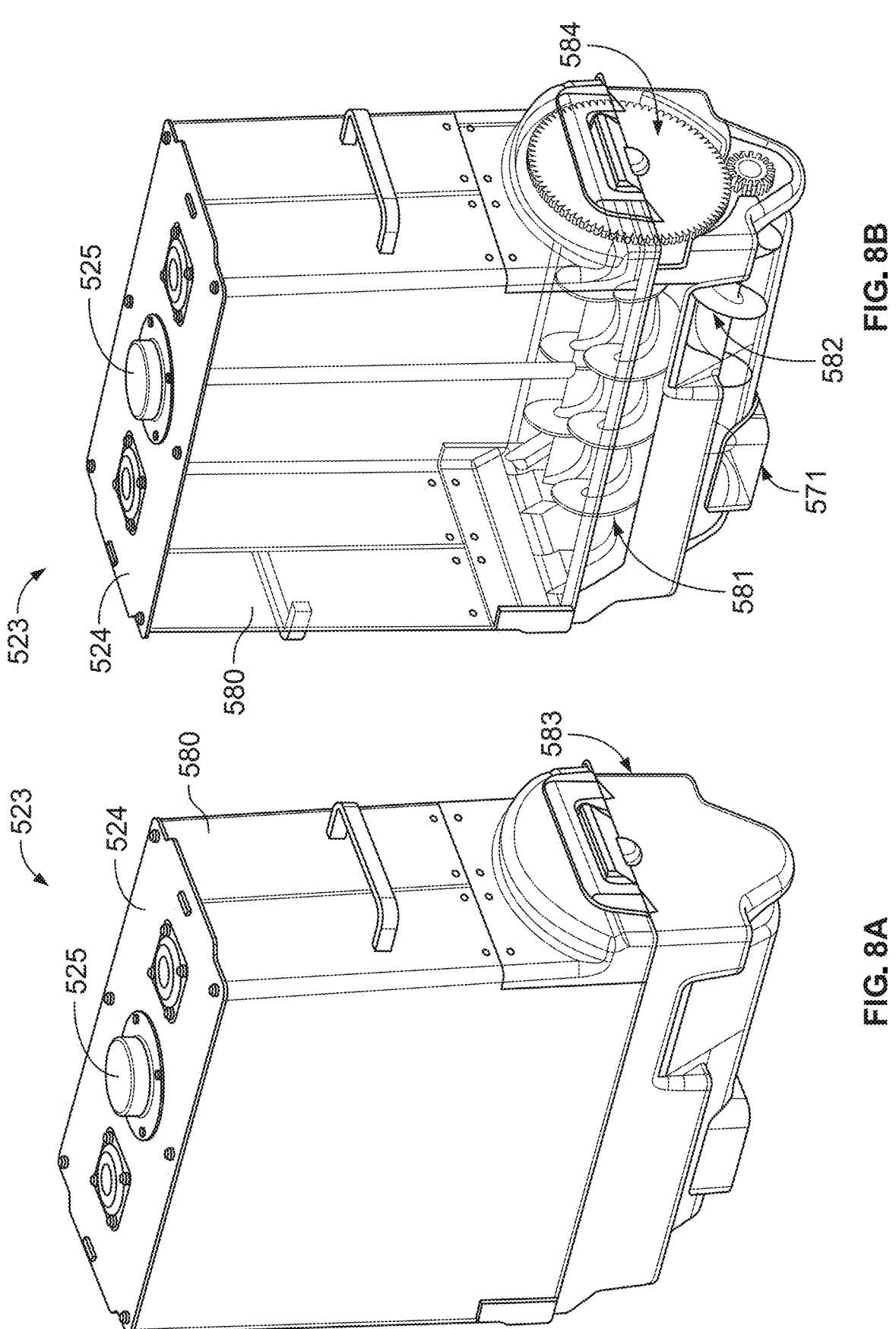
FIGS. 8A and 8B illustrate an auger section of an example food dispenser, according to aspects of the disclosure.

FIGS. 8A and 8B illustrate the hopper 523 removed from food dispenser 505. As shown, the hopper 523 includes the hopper lid 524, in which the temperature probe 525 may be inserted and supported. Ingredients are stored within the upper volume 580 of the hopper and dispersed into bowls via the hopper outlet 571. The upper lid 524 may close to seal the upper volume 580 of the hopper. The hopper may slide into the food dispenser 505 via rails (not shown) or otherwise may be positioned within the interior of the food dispenser 505 via clips, ledges, hooks, etc. The hopper lid 524 may cover the top of the upper volume 580 to seal in moisture and support the temperature probe 525.

As further shown in FIG. 8B (which illustrates the hopper 523 with transparent walls to show the interior of the hopper), the hopper 523 may include an auger section 583, including a lower auger section 582 and an upper auger section 581. The upper volume 580 may be connected to the section of the hopper 523 housing the augers via snap features or welding. The three augers, including the auger in the lower auger section 582 and two augers in the upper auger section 581 move at variable speeds in order to dispense ingredients from the hopper 523. Dispensing of each ingredient may be individually calibrated to determine the auger angular rotation that corresponds to a target serving weight. The serving weight is measured by the carrier sled holding the bowl into which the ingredient is deposited. If needed, additional dispensing attempts may be made by the food dispenser 505 to achieve the target amount of deposited ingredients. The upper augers and lower auger may each be geared by a gearing drive 584 such that they spin at the same or different speeds relative to each other.

Figure 8C:
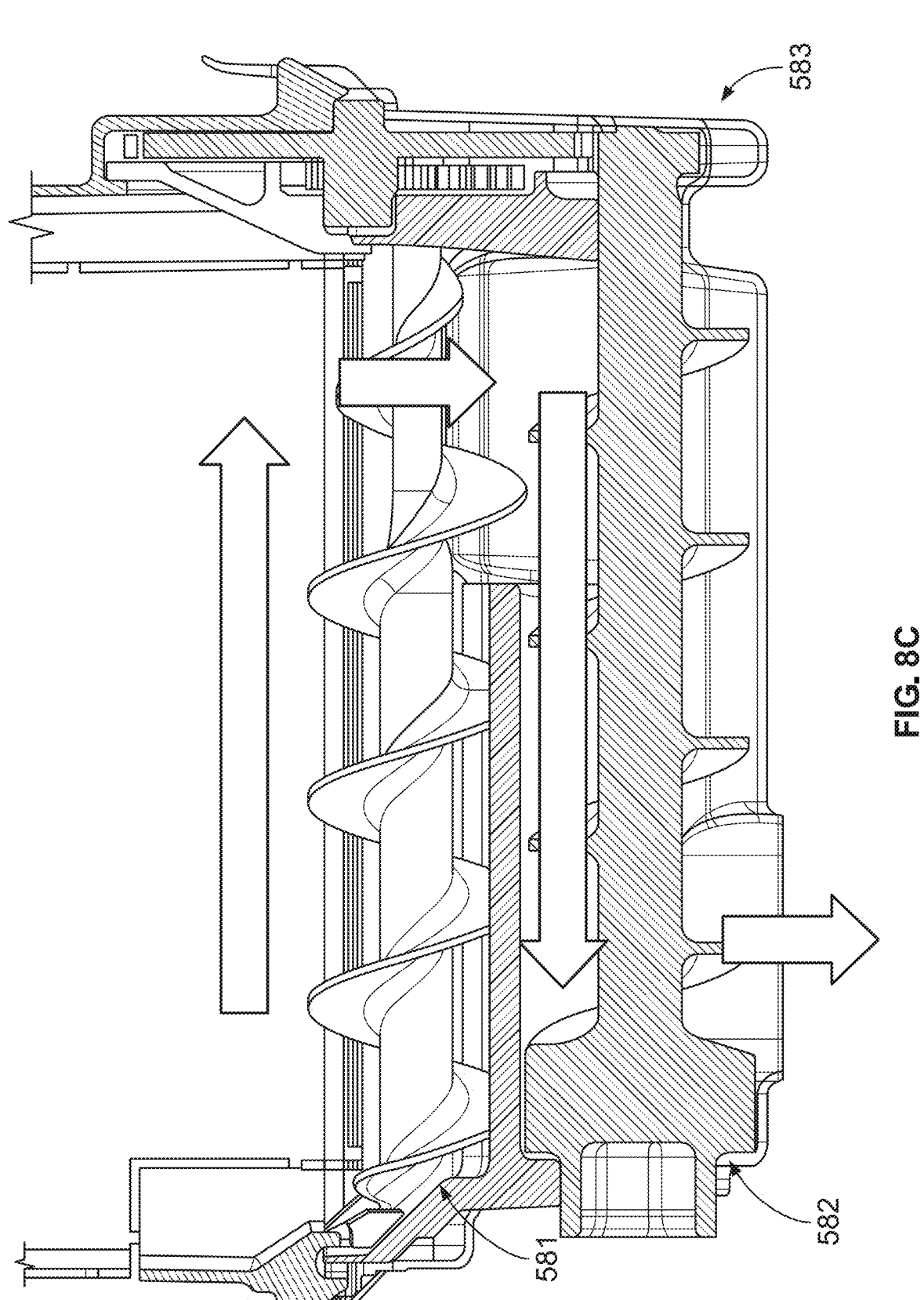
FIGS. 8C and 8D illustrate the movement of food through an auger section of an example food dispenser, according to aspects of the disclosure.
Figure 8D:
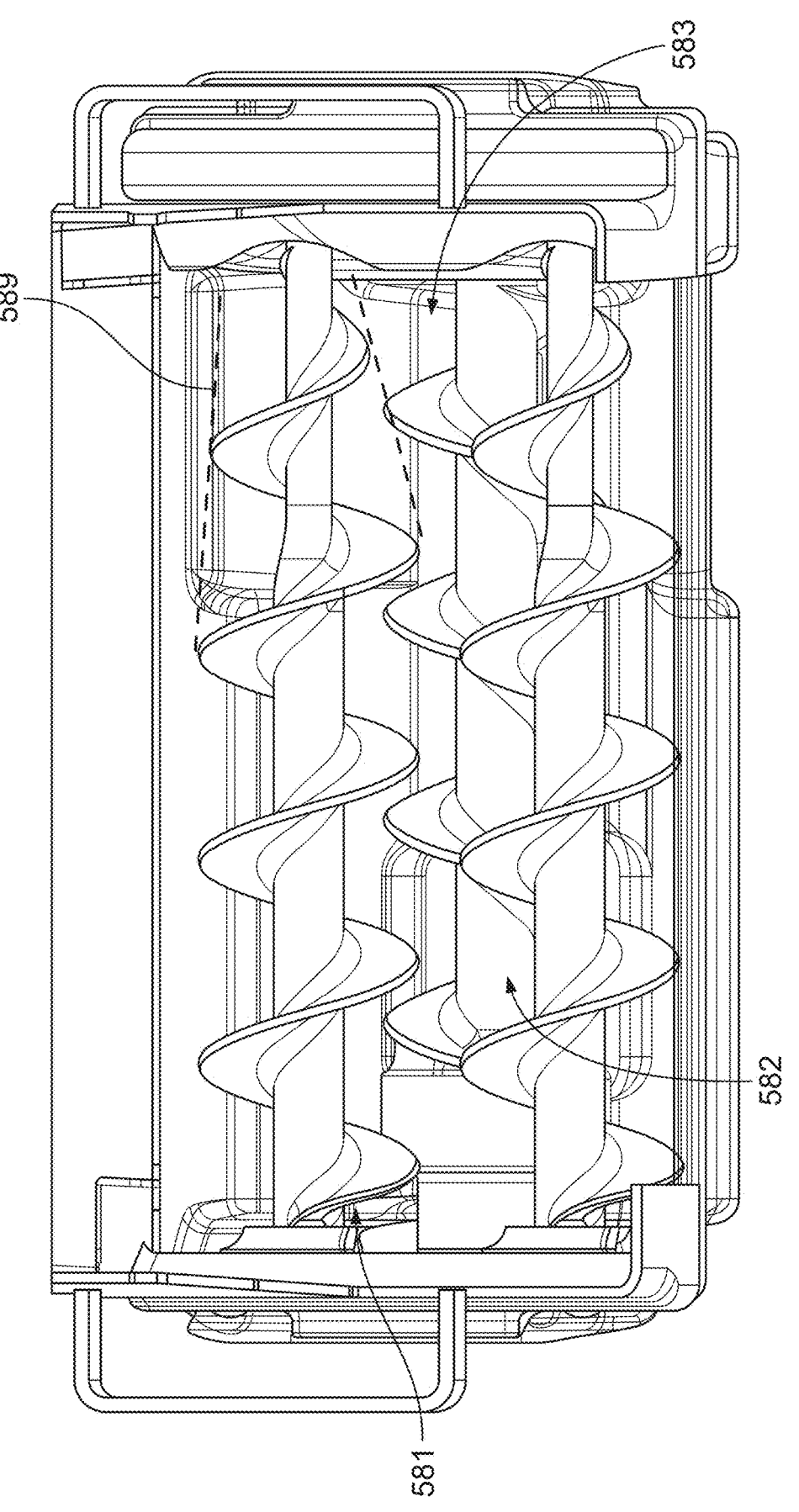

The augers may have a custom geometry that may be optimized for dispensing across a variety of ingredients. Moreover, each food dispenser in the robotic system may have different types of augers. For instance, and as shown in FIGS. 8C and 8D, which illustrates a side and top-down view of the auger section 583, respectively, the augers in the upper auger section 581 work in conjunction with the auger of the lower section to dispense food. Referring to FIG. 8C, the food traverses a path, illustrated by the arrows, which includes moving from the above the upper auger section 581 towards the front side of the hopper. The food then drops to below the upper auger section 582, where it is then moved towards the rear of the hopper before being dispensed into a bowl.

Referring to FIG. 8D, the augers of the upper auger section 589 may be tapered, as illustrated by block line 589. The tapering may allow the food to pass from the upper auger section 589 to the lower auger section 582. The tapering of the augers may include tapering on both the helices of the augers and/or the shaft of the augers. The taper allows for smooth transitions between successive auger sets as well sufficient gaps to resist tunneling, ensuring continuous and uninterrupted flow of food materials. The taper also enhances the system's ability to handle a variety of food types. Although not illustrated, the auger of the lower auger section may also be tapered to allow the food to be dispensed out of the hopper. Such a configuration of the auger sections may prove for increased amounts of usable food material to be stored and processed by the hopper. Moreover, the configuration provides for the continuous movement of food materials along the entire floor of the hopper then back towards the output allowing the system to completely empty.

Figure 9:
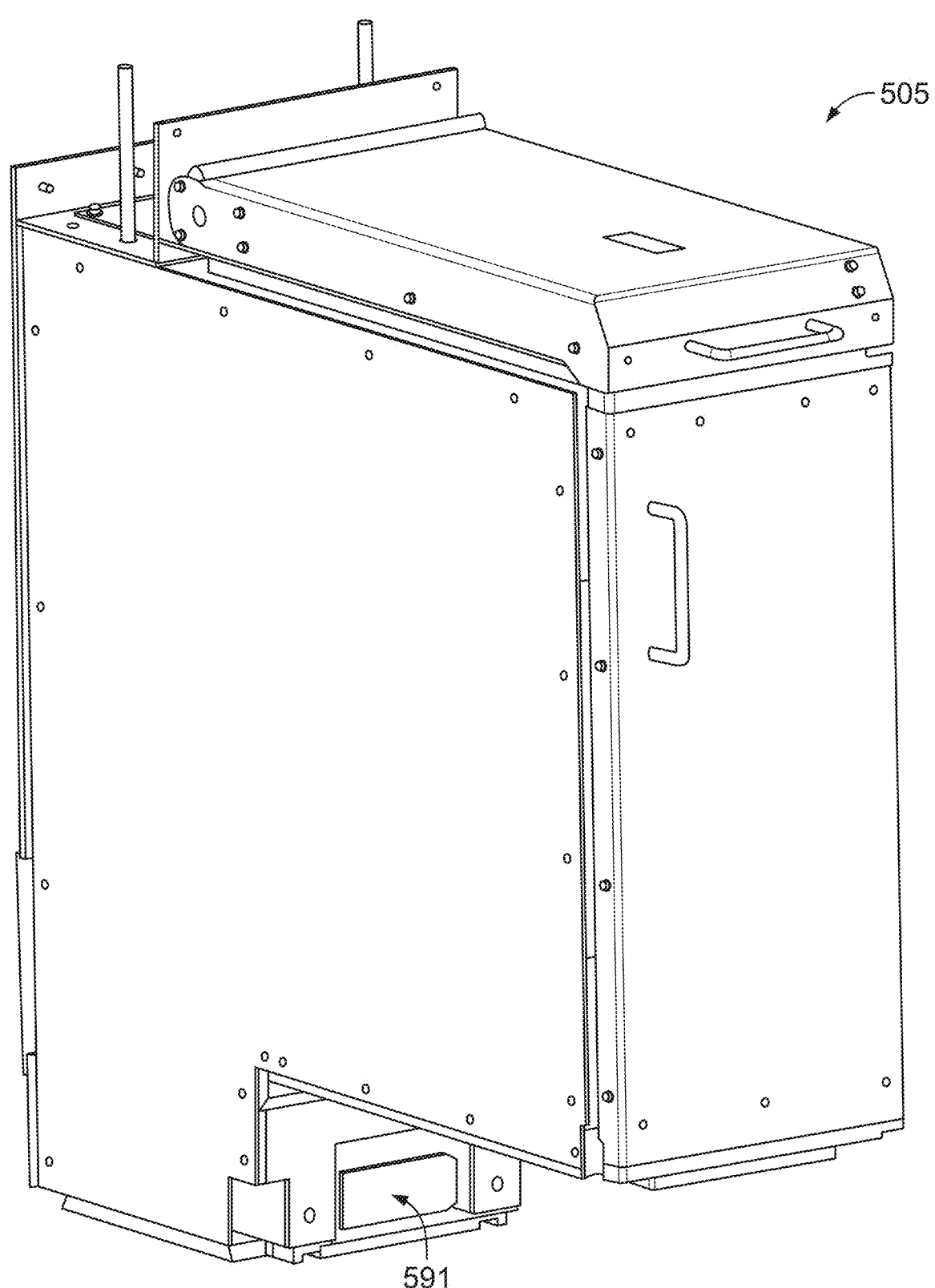
FIG. 9 illustrates an example reader of a food dispenser, according to aspects of the disclosure.

The distance between the augers and/or the helices of the augers may be sufficiently large to prevent packing and tunneling of food materials, while still avoiding excessive mixing or crushing of more delicate food items such as rice and lettuce. In this regard, the distances between the augers and/or the helices of the augers may be customized or otherwise adjusted depending on the food item being processed by hopper. For instance, the helices may be spaced such that granular items, like beans, can also be dispensed with precision. The food dispenser 505 may include a reader 591 configured to communicate with the carrier sleds, such as carrier sled 331, to check for the presence of the carrier sled and/or confirm the amount of ingredients deposited within the bowl on the carrier sled, as shown in FIG. 9. The reader may be a near-field communication (NFC) reader. As further shown in FIG. 9, the reader 591 is positioned at the base of the food dispenser. However, readers may be positioned elsewhere on (or near) the food dispenser within reading distance of the carrier sled.

Figure 10:
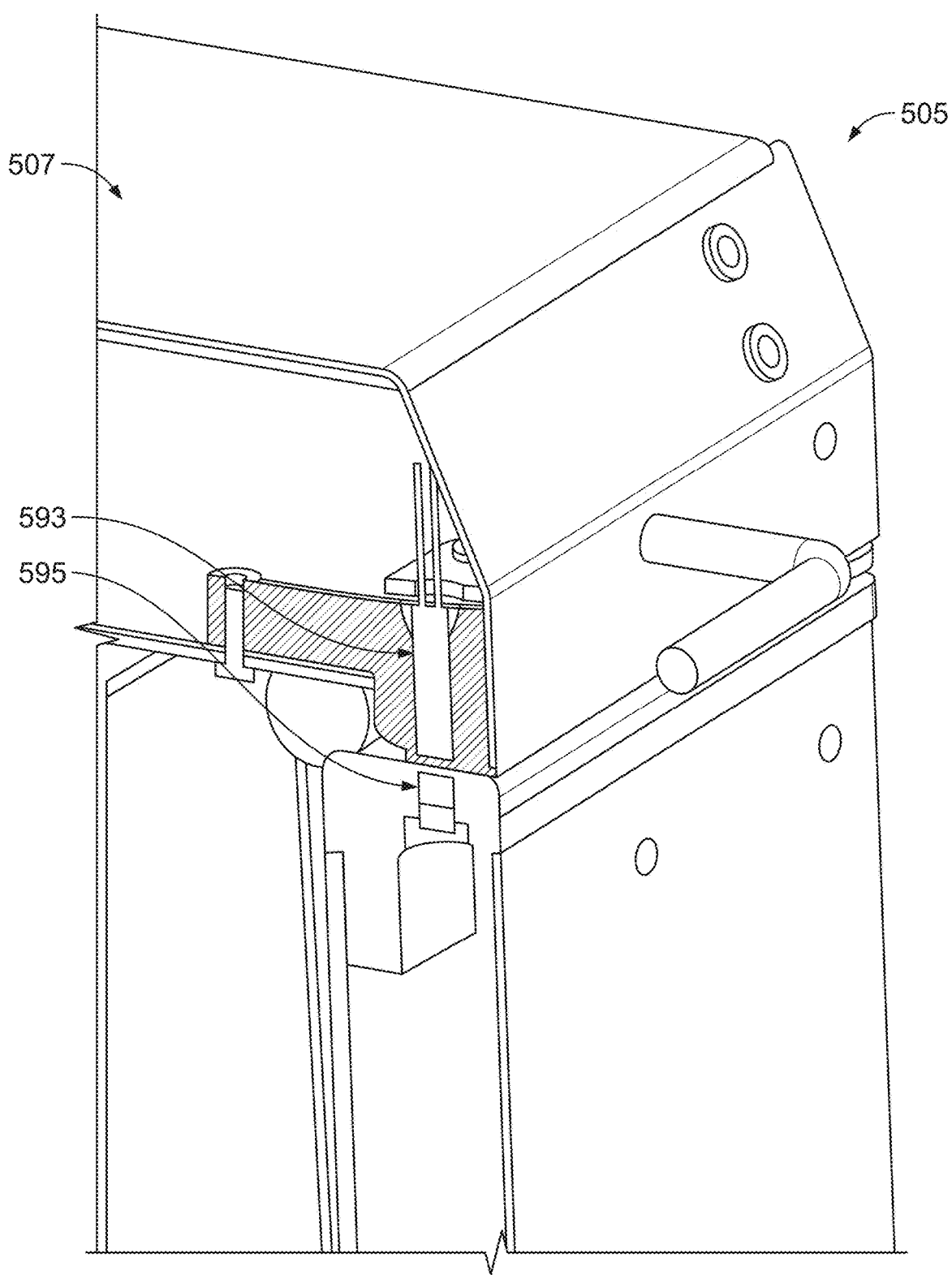
FIG. 10 illustrates an example switch of a food dispenser, according to aspects of the disclosure.

FIG. 10 illustrates a sensor 593, such as a switch, that may be configured to cease the food dispenser's 505 operation, or part of the operation of the food dispenser, such as the augers, when a door, such as access door 503 or upper access door 507, of the food dispenser 505 is open. In this regard, the sensor 593 may detect a magnet 595 positioned on or within the access door 503. When the upper access door 507 or the access door 503 is open, the sensor and magnet may be positioned far enough away from each other that the sensor no longer detects the magnet, indicating at least one of the doors is open. The sensor 593 may disable the operation of the food dispenser and/or send a notification to an operator and/or send a notification to a controller. The operator and/or controller may take action in response to receiving the notification, such as stopping the robotic system until the door is closed. In some instances, a pin may prevent the access door 503 from being opened without first opening the top upper access door 507.

Sauce Dispenser

FIG. 11 illustrates an example condiment dispenser 1107 which may be compared with condiment dispenser 107. The condiment dispenser 1107 is configured to hold condiments at food-safe temperatures and dispenses condiments into bowls when the conveyance system positions bowls under the condiment dispenser 1107. As shown in FIG. 11, the condiments may be stored on a carousel 1111 in stacks of condiment cups. The condiment dispenser may include any number of stacks, such as of 5, 10, or more or fewer stacks and each stack may include any number of condiment cups. The condiment cups may be of any size, such as 1 oz, 2 oz, or larger or smaller. The condiment dispenser 1107 may dispense zero, one, two, three, or more condiments into a bowl, depending on the order.

The carousel 1111 may be manually loaded with condiments by lifting the lid 1113 and/or opening the door 1115 of the condiment dispenser 1107. The condiments may be specific to each carousel location. For instance, one column may store a first condiment type and a second column may store a second condiment type. In the event an order for a bowl includes two sauces, the portion cups may be dispensed on opposite sides of the bowl to allow space for lid attachment. The condiment dispenser 1107 can measure the number of sauce cups remaining in each carousel location using one or more sensors, such as non-contact IR height sensors 1131.

Each column within the carousel 1111 may include a passive mechanism 1101 that allows for a single cup to be dispensed, actuated by opening an actuator door 1103 above the bowl. The actuator door 1103 may be opened by sliding the actuator door along the axis represented by line 1105 to align the opening 1109 in the actuator door with the column storing the condiment needed for the order such that the bottom condiment is released from a condiment support 1101 through the opening 1109 into the bowl.

The condiment dispenser 1107 may be held at a cold, food-safe temperature, such as between (or at) 32 and 41 degrees Fahrenheit. In other examples, the condiment dispenser 1107 may be held at a warm, food-safe temperature, such as between (or at) 135 and 200 degrees Fahrenheit. Although not shown, the condiment dispenser 107 may include heat transfer tubing to maintain the temperature within the condiment dispenser. The temperature of the condiment dispenser may be monitored by an air temperature probe 1121. Air temperature probe 1121 may include one or more temperature sensors. The temperature readings of the air temperature probe 1121 may be collected via an NFC reader 1137 in the condiment dispenser lid 1113. If the temperature reading falls outside the appropriate range, the operator or controller may be notified and the operator or controller. If the reading is out of range for a certain time, the dispenser may be shut off and the condiments stored therein deactivated from the menu to protect food safety.

The condiment dispenser 1107 may include a reader 1141 configured to communicate with the carrier sleds, such as carrier sled 331, to check for the presence of the carrier sled and/or confirm the amount of condiments deposited within the bowl on the carrier sled. The reader may be a near-field communication (NFC) reader. As further shown in FIG. 11, the reader 1141 is positioned at the base of the condiment dispenser. However, readers may be positioned elsewhere on (or near) the condiment dispenser within reading distance of the carrier sled.

Heating and Cooling

Heating and cooling of the food dispensers and/or condiment dispensers described herein, such as food dispensers 105, 505, and condiment dispensers 107, 1107 may be controlled by separate heating and cooling systems, such as heater/steamer 123 and chiller 121. The heating system and separate cooling system provide temperature-controlled fluid to the food dispensers and condiment dispenser to maintain food safety temperatures. In this regard, hot and/or cold fluid may be circulated along insulated manifolds at the top of the machines, into and/or out of heat transfer tubing, such as the heat transfer tubing 521 of food dispenser 505. Dispensers can be connected to either the hot or cold manifold depending on the required machine configuration. For instance, some food dispensers may be connected to a hot manifold and other food dispensers and the condiment dispenser may be connected to a cold manifold. In some instances, a machine may be connected to both a cold manifold and a hot manifold. Valves may be positioned at dispensers, such as food dispensers and/or condiment dispensers, and may be manually adjusted to restrict the fluid flow for the purpose of temperature adjustment at an individual dispenser and for system flow balancing.

Figure 12:
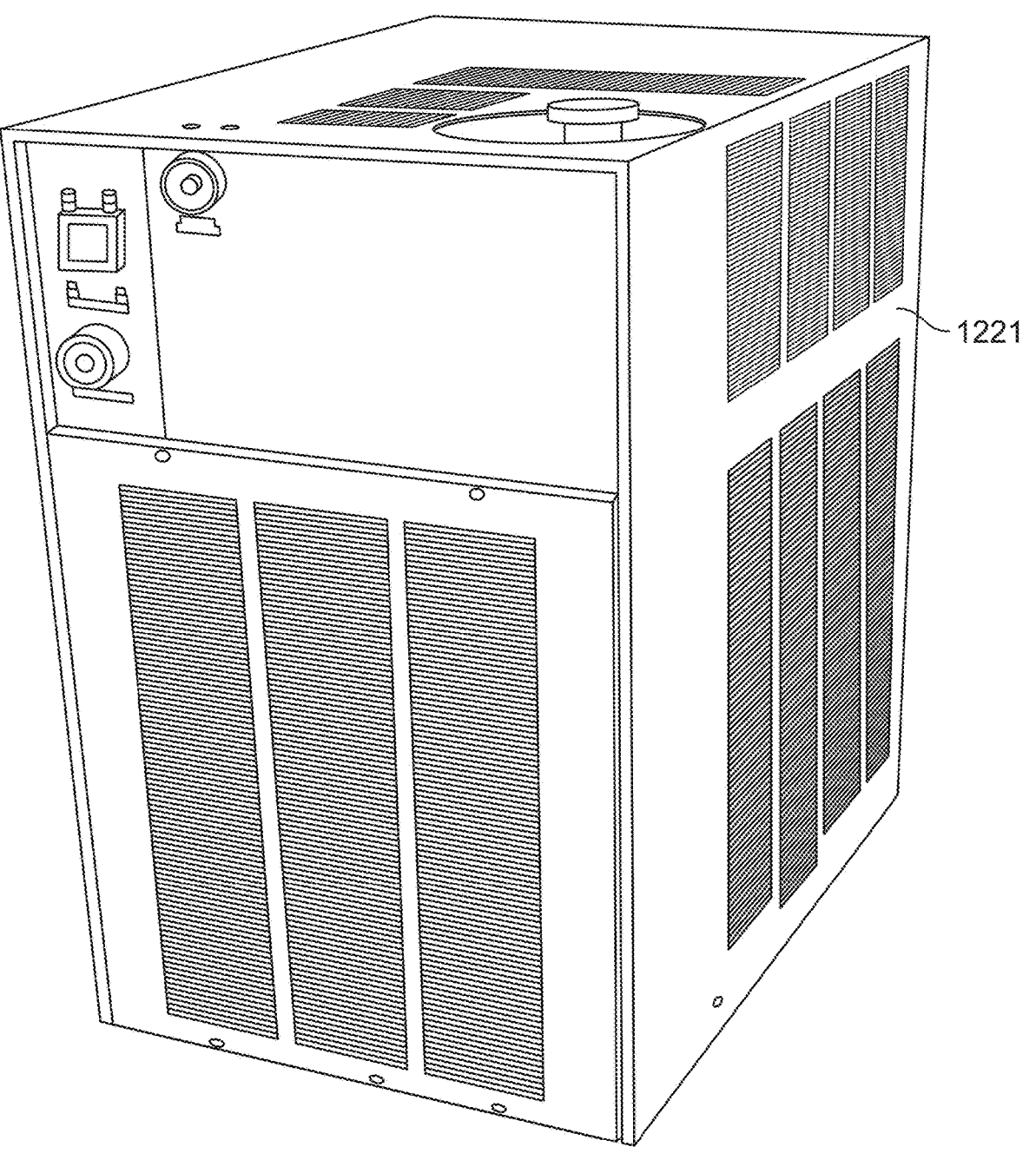
FIG. 12 illustrates an example chiller, according to aspects of the disclosure.

The heating and cooling systems may each have a single system temperature set point, but in some instances, heating and cooling systems having multiple system temperature set points may be used. FIG. 12 illustrates an example chiller 1221 which may operate as a cooling system, such as chiller 121. The temperature of chiller 1221 may be set to a particular temperature using a control panel or remotely, such as through controller 133 or interface 131.

Figure 13:
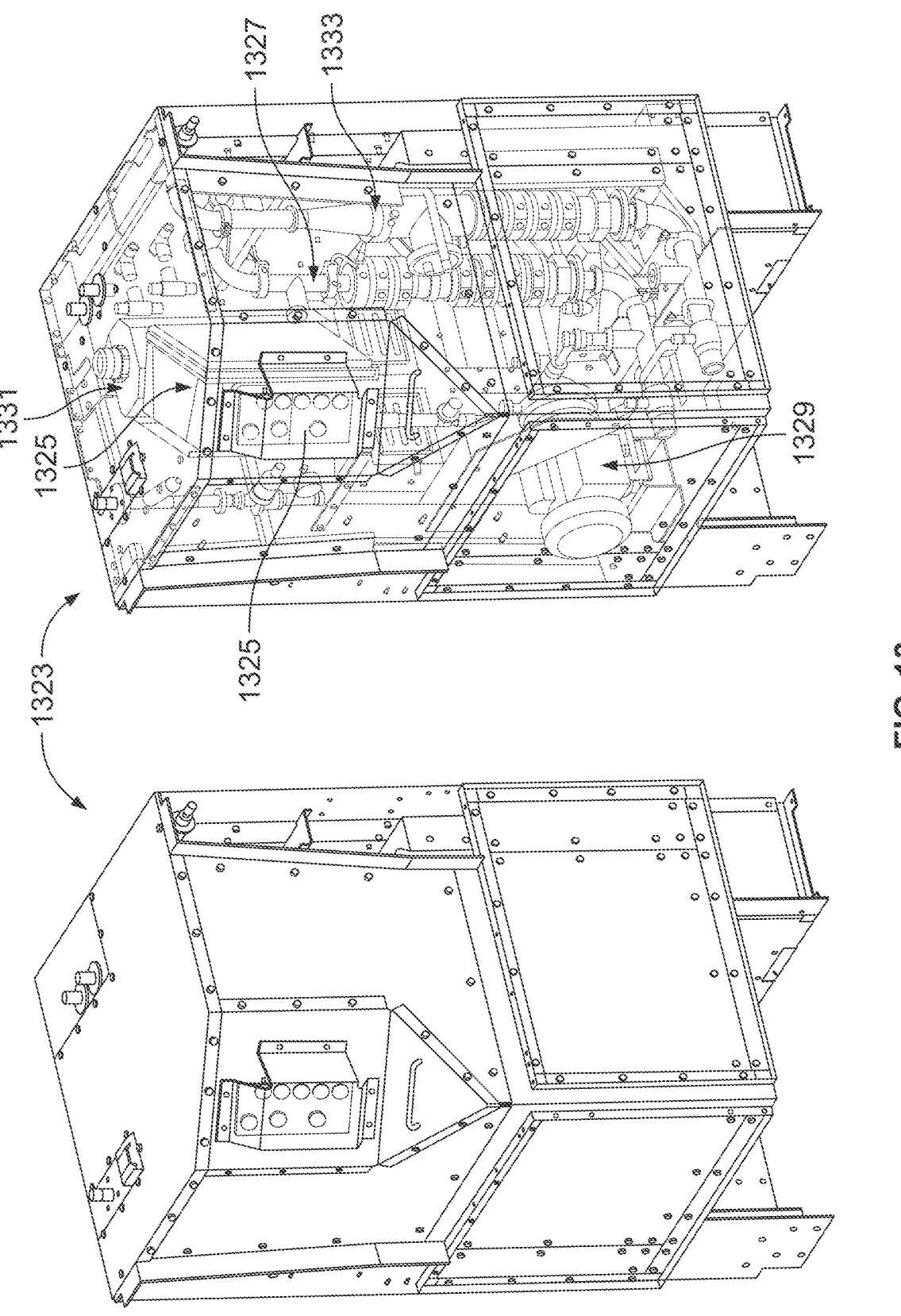
FIG. 13 illustrates an example heater and steamer, according to aspects of the disclosure.

FIG. 13 illustrates an example heater/steamer which may operate as a heating system such as heater/steamer 123. In this regard, the heater/steamer 1323 may include temperature sensors (not shown) that are used to control electric resistive heating elements 1327. A controller 1325, housed with an controller enclosure 1326, may maintain the temperature set point by turning on/off the heating elements 1327 as needed. The system temperature set point can be adjusted at the control panel 1325 inside the heater/steamer enclosure. A centrifugal pump 1329 may circulate heated fluid through an expansion tank 1331, distribution manifold, and the food and/or condiment dispensers, such as through the heat transfer tubing.

The heater/steamer 1323 may provide steam, using steamer 1333, to the food dispenser and/or condiment dispensers to maintain temperature and food quality. In this regard, the heater/steamer 1323 may have temperature sensors which may be used to control heating elements of the steamer 1333 and fluid level sensors to control the water fill level in a boiling vessel of the steamer 1333. A liquid, such as reverse osmosis treated water may be provided into the boiling vessel until the water fill level sensor is triggered. The heating elements, such as heating coils, may then be turned on and off by a controller using temperature sensor feedback to produce a predetermined amount of steam. The steam is distributed to the hot dispensers through an insulated manifold, flexible hose, and flexible bellows cup into the top of the hoppers of the food dispensers. Although the heater and steamer are shown as a single unit, the heater and steamer may be separate units.

Vacuum System

Figure 14:
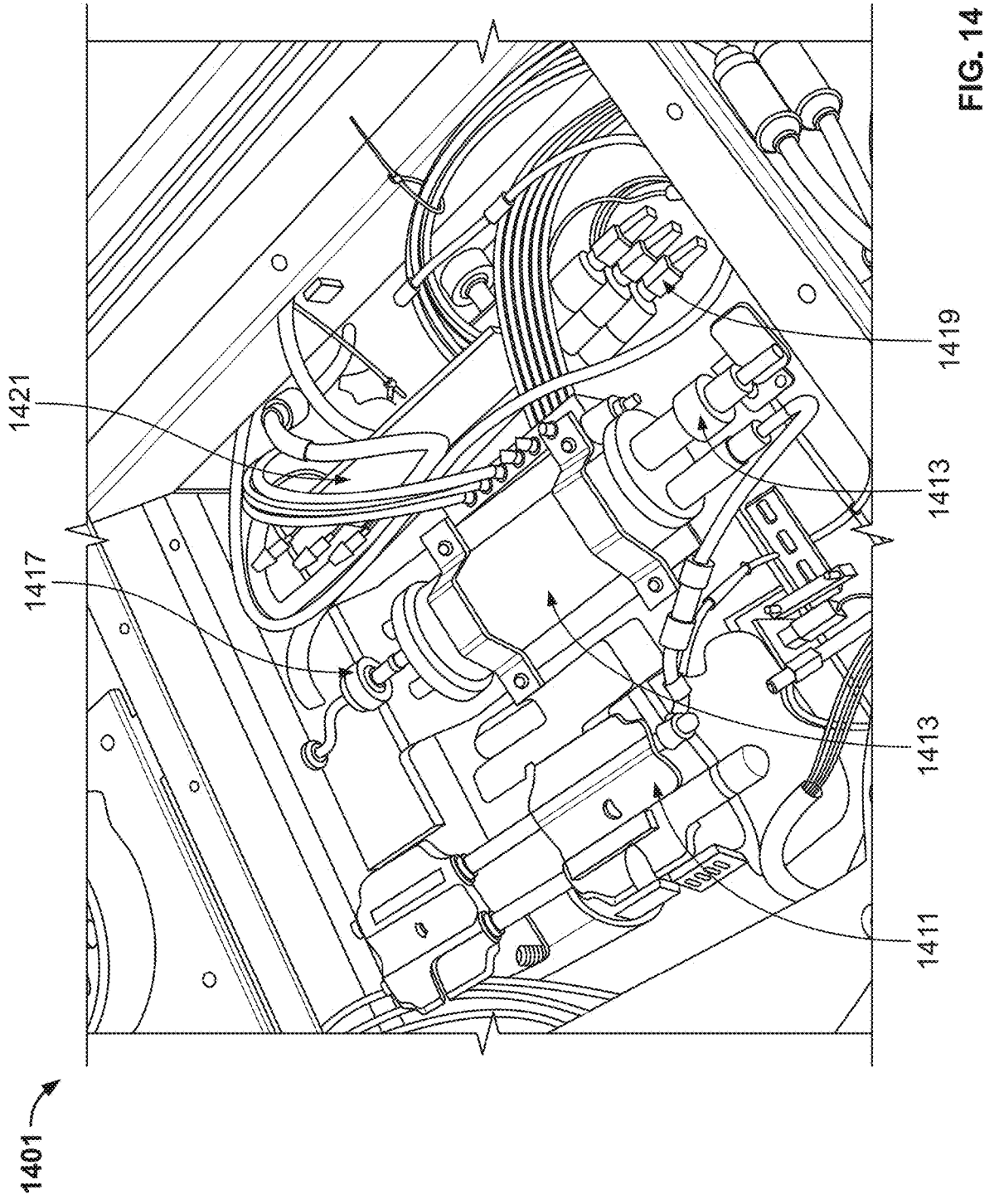
FIG. 14 illustrates an example vacuum system, according to aspects of the disclosure.

The robotic system 101 may further include a vacuum system to provide suction to components of the system, such as the lidder 109 and bagger 111. FIG. 14 illustrates an example vacuum system 1401 consisting of a vacuum pump 1411, reservoir 1413, vacuum switches 1415, pressure sensors 1417, solenoid valves 1419, and flow restrictors 1421. In operation, pump 1411 may provide a vacuum to reservoir 1413, which is then distributed to solenoid valves 1419 and out to each module end effector (e.g., end effectors of the lidder and bagger). The reservoir 1413 and flow restrictors 1421, may allow for the simultaneous operation of multiple modules. In this regard, starting to pull the vacuum on one module may not quickly increase system pressure causing loss of adequate vacuum on other operational modules. The flow restrictors 1421 may also balance the vacuum system to the needs of each module. For example, a module gripping a porous paper bag requires more flow than lifting a plastic lid, and therefore, the flow restrictors 1421 may ensure more flow is provided to the module gripping the paper bag (e.g., a bagger) that the module gripping the lid (e.g., a lidder). Pressure sensors 1417 may be used to determine whether a module end effector has connected with its target. For instance, when a lidder, such as lidder 109, has gripped a lid with a suction cup end effector.

Lidder

Figure 15:
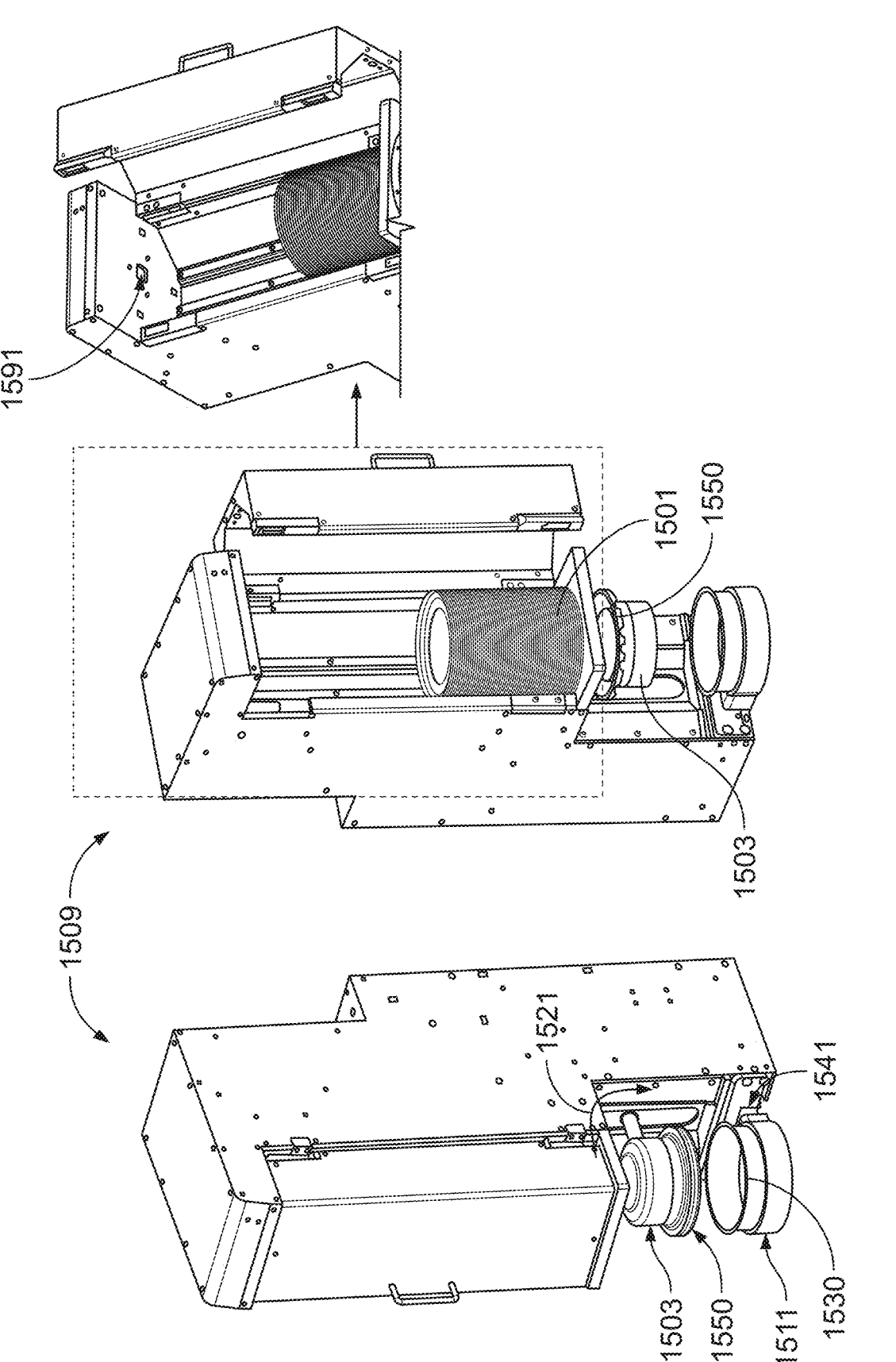
FIG. 15 illustrates an example lidder, according to aspects of the disclosure.

FIG. 15 illustrates an example lidder 1509, which may be compared with lidder 109. As illustrates, the lidder 1509 houses a stack of lids 1501 which are dispensed from the bottom of the stack via an end effector 1503 with suction cups. Suction may be provided to the end effector 1503 from the vacuum system, as described herein. The end effector 1503 with vacuum on may moves upward towards the stack of lids 1501 and pick a lid from the bottom of the stack. When reduced pressure due to lid contact is detected by the pressure sensor (not shown), indicating the end effector 1503 has gripped the bottom lid, the end effector 1503 may move downward to pull the lid past the flexible retaining tabs (not shown) that keep the stack in place.

Upon the end effector grasping a lid, the end effector 1503 may rotate 180 degrees, as illustrated by arrow 1521. By rotating a lid 180 degrees, the lid may be oriented over a bowl. Although FIG. 15 illustrates the end effector 1503 rotating in the direction of arrow 1521, the end effector 1503 may rotate in the opposite direction. Once oriented over a bowl, the lidder may move the end effect downward toward the bowl to secure the lid into place over the bowl. In this regard, the lid may be snapped onto or otherwise rested on the bowl.

For example, and as illustrated in FIG. 15, end effector 1503 may grasp lid 1550 from the bottom of the stack of lids 1501. After grasping the lid 1550, the end effector 1503 may move downward away from the stack of lids to remove the lid 1550 from the stack of lids 1501. The end effector 1550 may then rotate 180 degrees, as illustrated by arrow 1521. The end effector 1503 may then move downward toward bowl 1530 positioned within a carrier sled 1511 moved into position by a conveyance system. The end effector may then attach or otherwise rest the lid 1550 on the bowl 1530. Although the end effector is described as rotating 180 degrees after removing the lid and before moving downward towards the bowl, rotation may happen simultaneously with either or both movements.

The lidder 1509 may include a reader 1541 configured to communicate with the carrier sleds, such as carrier sled 1151, to check for the presence of the carrier sled and/or confirm the placement of a lid on a bowl, such as lid 1550 on bowl 1530. The reader may be a near-field communication (NFC) reader. As further shown in FIG. 15, the reader 1541 is positioned at the base of the lidder 1509. However, readers may be positioned elsewhere on (or near) the lidder 1509 within reading distance of the carrier sled.

Once the lid is in place, the end effector may lift the lid. As the lid is lifted, the reader 1541 may measure the carrier sled weight sensor to verify that the lid is attached to the bowl. The lid, and bowl attached thereto, may then be set back down into the carrier sled and vacuum of the end effector 1503 may be released. The lid fill level within the lidder 1509 may be measured using a sensor, such as non-contact IR height sensor 1591.

Bagger

Figure 16:
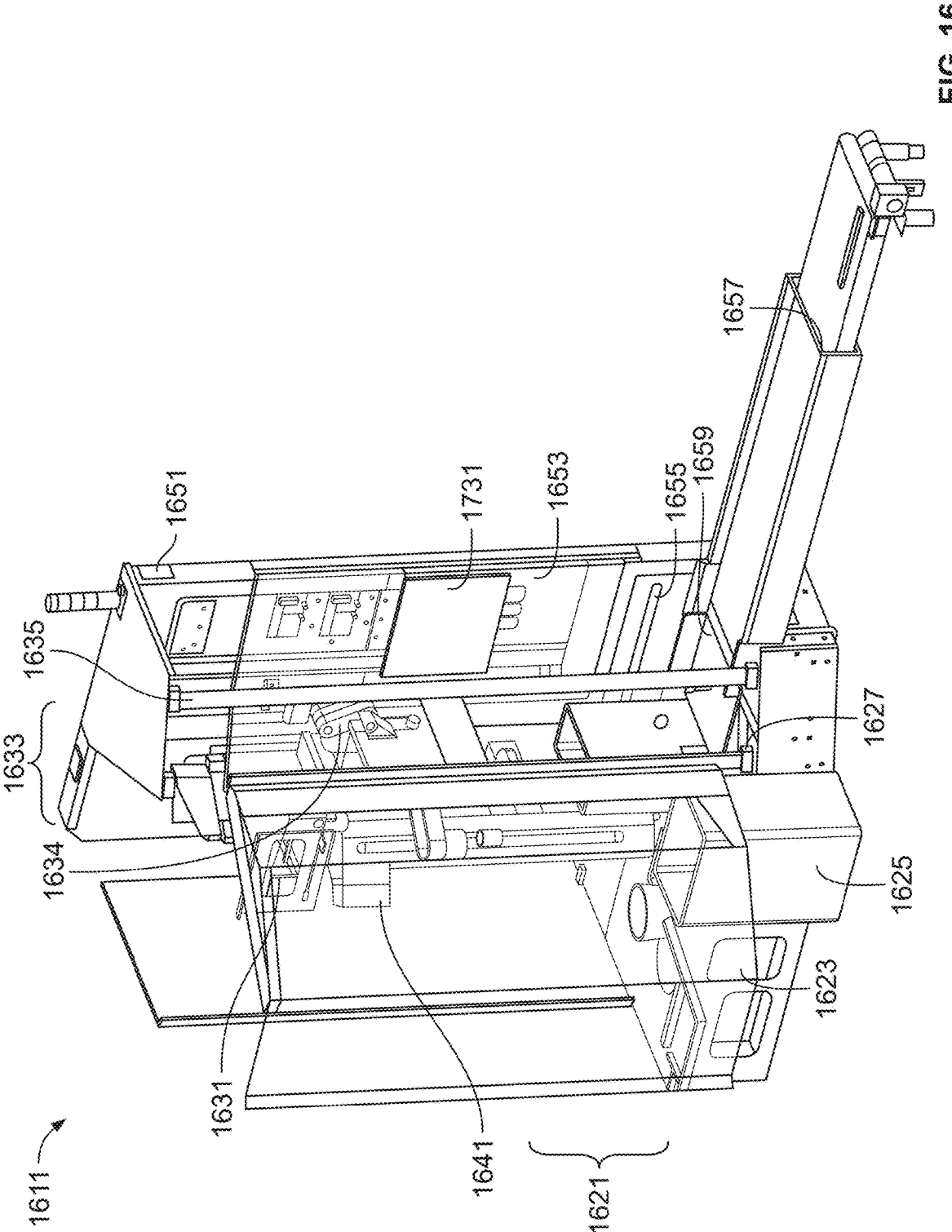
FIG. 16 illustrates an example bagger, according to aspects of the disclosure.

FIG. 16 illustrates an example bagger 1611, which may be compared with bagger 111. The bagger 1611 is configured to move completed bowls from the conveyor system to a bag, chute, or reject. The bagger may further be configured to dispense bags, apply labels, open the bag, insert the bowl into the opened bag, insert utensils into the bag, close the bag, and convey the bag to a location for pickup or delivery.

The bagger 1611 may move completed bowls, with lids attached, from their respective carrier sleds to a chute 1623, reject can 1625, or bag (not shown) using a bowl mover 1621. The bowl mover 1621 may include an end effector configured to lift completed bowls. The end effector may be attached to a two-degree of freedom arm. The bowl mover 1621 may move along a vertical axis and rotate around a rotation axis. In operation, the bowl mover 1611 may be positioned above a completed bowl with a lid on a carrier sled. The bowl mover may move the end effector down towards the bowl and grasp the lid using suction provided by the vacuum system or separate vacuum system included in the bagger 1611. In some instances, the bagger 1611 may include a vacuum module 1627, which may include a vacuum accumulator connected to the vacuum system. The vacuum accumulator may provide vacuum to the components of the bagger 1611, such as the bowl mover 1621. The vacuum provided by the vacuum accumulator may supply vacuum under the control of one or more solenoids. A vacuum sensor (not shown) may be used to detect when a lid is attached to the end effector.

After grasping the bowl, the bowl mover 1621 may pick up the bowl and confirms that the weight reading on the carrier sled shows that the bowl has been lifted. In this regard, as the bowl is lifted, a reader (not shown) may measure the carrier sled weight sensor to verify that the bowl has been at least partially lifted from the carrier sled.

Next, the bowl mover may rotate along the rotation axis to move the bowl to the appropriate location, either the chute 1623, reject can 1625, or into a bag depending on the instructions for that bowl. The chute 1623 and reject can 1625 are locations where the bowl mover can place the bowls, along with a bag (as described further herein). The chute 1623 may be used to store completed bowls that require some manual intervention. The reject can 1625 may be used to remove bowls that did not meet a particular requirement of an order or standard or have been canceled during assembly. Once the arm is moved into place the vacuum is released from the end effector and the bowl is released. The bowl mover may then repeat the same process with additional bowls.

The bagger 1611 may include a bag queue 1631 storing a stack of bags. The bag queue 1631 may be a spring loaded dispenser that can hold a stack of bags, such as paper bags into which the bowl mover 1621 may put completed bowls. A bag puller 1633 may remove bags from the bag queue 1631. In this regard, the bag puller 1633 may include a vertical arm 1634 and a puller arm 1635. The vertical arm 1634 of the bag puller 1633 may move vertically and may have a rotation axis implemented by the puller arm 1635. The puller arm 1635 may be used to pull bags from the bag queue 1631 via vacuum suction, provided by a vacuum system, such as vacuum system 1401, and move the bag down, via the vertical arm 1634, to a labeler 1641 and opener. Confirmation that the bag puller 1633 has successfully obtained a bag may be verified using a sensor, such as a vacuum sensor.

The labeler 1641 may label the bag to identify the food bowls and/or other information about the contents of the bag. The labeler 1641 may include a printer that is configured to print labels for each bag. For instance, the printed labels can include any number of custom fields including QR codes, order ID, bag contents, marketing information, customer information, etc. The bag puller 1633 may position the bag in place so that the printer can print the label on the bag directly. In some instances, the labeler 1641 may include a sticker printer which prints labels on stickers. The bag puller 1633 may position the bag in place so that the sticker, with the printed label, can be applied to the bag.

While the bag puller 1633 maintains grip of the bag, an opener (not shown) may pull the bag open. In this regard, a suction panel of the opener, may grasp the opposite side of the bag than the bag puller 1633. Attachment of the opener to the bag may be verified using a vacuum sensor. Once the opener grasps the bag, the bag puller may move in a direction away from the opener to pull open the bag. In some instances, graspers that grasp the bag may assist with holding of the bag in position.

Once open, the bowl mover 1621 may place completed bowls from the order into the bag. In some instances, the bowl mover 1621 may place bowls from an order within multiple bags, such as in the case of a large order that would not fit in a single bag.

After the bowls are placed in the open bag, a forker 1651 may place utensils within the bag. The forker 1651 may include a hopper that holds utensil packets or single utensils, such as forks, spoons, knives, chopsticks, etc., and a pneumatic tube with a vacuum-powered suction cup on the end. An arm, to which the pneumatic tube and vacuum-powered suction cup are attached, may position the tube and suction cup over the hopper. The suction cup may be inserted into the hopper by the pneumatic tube and the suction cup may attach to a utensil or utensil packet. Attachment with a utensil and/or utensil packet may be detected with a vacuum sensor. The pneumatic tube may retract the suction cup from the hopper upon a utensil and/or utensil packet being detected. The arm may then position the suction cup over the open bag and the suction cup may subsequently may drop the utensil packet into the open bag.

Once all bowls and utensils are inside the bag, suction may be released from the bag puller 1633 and the opener. A bag closer 1653 may then apply one or more stickers to seal the bag closed. By sealing the bag, items are prevented from falling out of the bag or removed from the bag, and also indicate that the contents has not been tampered with.

The bag, before or after being sealed, may be placed by the bag puller 1633 onto a ledge 1659. A pusher 1655 may then push the bag off of the ledge 1659 onto a conveyor belt 1657. The conveyor belt 1657 may move the bags to a location for pickup, such as by restaurant staff, pickup drivers, and/or customers.

In some instances, the lidder 1509 and the bagger 1611 may be located behind a large safety guard. If the guard is open, movement of the lidder and bagger components may stop for operator safety. A latch controlled by the robotic system 101 may prevent the guard from opening when the bagger and/or lidder is in motion, unless a command overriding the safety mechanism is selected on the human machine interface (HMI) 1731, described herein.

Interface and Controller

Figure 17:
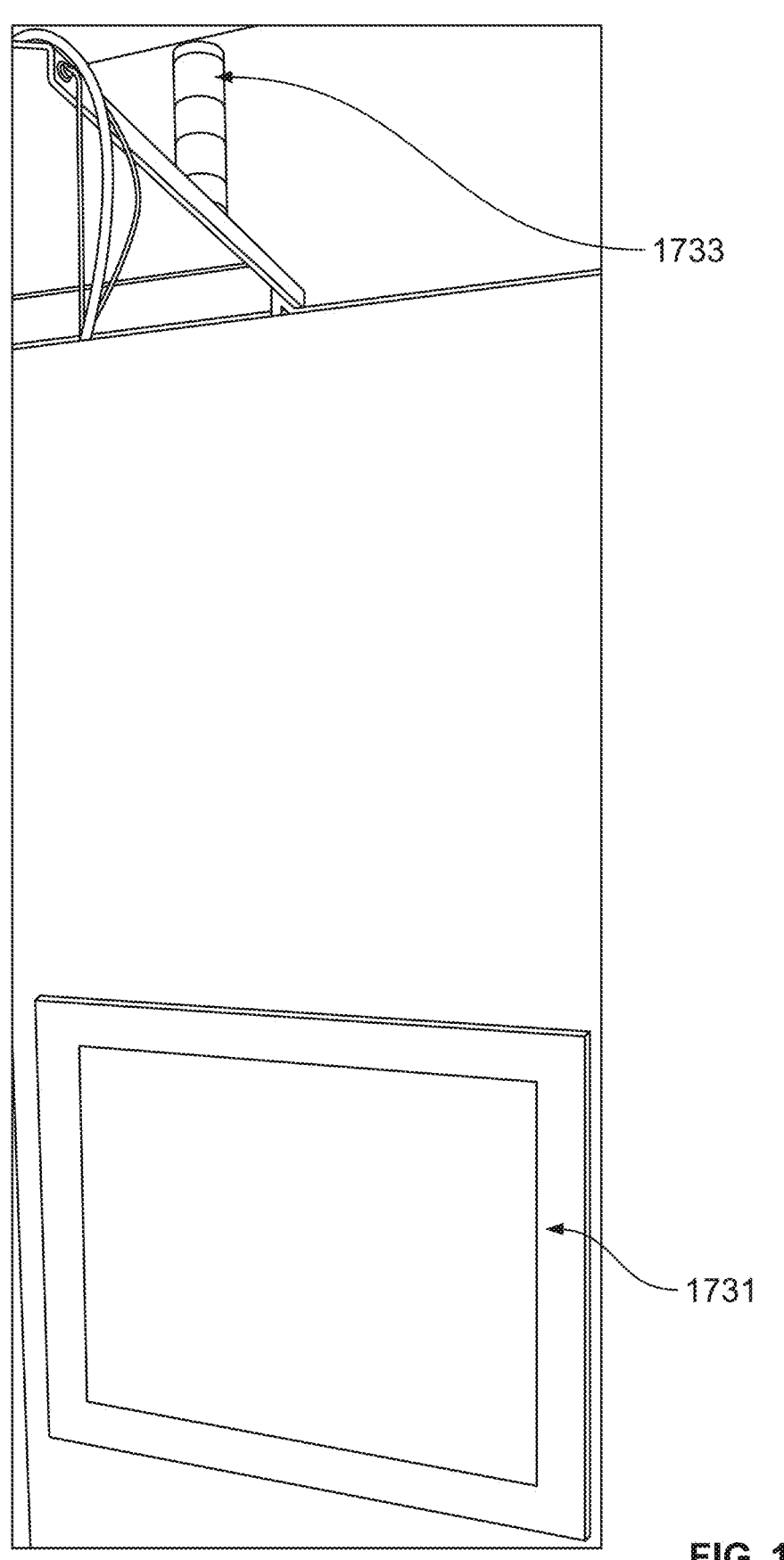
FIG. 17 illustrates an example interface, according to aspects of the disclosure.

As illustrated in FIG. 17, the robotic system may include an interface 1731, which may be compared with interface 131. The interface may be a touchscreen interface or may include physical input devices through which an operator may control the equipment of a robotic system, such as robotic system 101. In this regard, an operator may view and modify the order queue, add orders manually, read and resolve errors, and view the status of components of the robotic system 100. Moreover, an operator may adjust temperatures of the heater/steamer, chiller, etc., and, in some instances, control valves on the inlets and outlets of the food dispensers and/or condiment dispensers to adjust the temperature within the dispensers.

As further illustrated in FIG. 17, a stack of lights 1733, including a red, amber, and/or green lights, may be used to provide system visual operation status notifications. In some instances, the controller 133 may trigger alerts when errors with orders or the operation of the robotic system 100, such as issues with the food/condiment dispensers, chiller, heater/steamer, or issues with the bagger or lidder are detected. Such alerts may include lighting a light on the light stack 1733, sounding an alarm, or sending a ticket outlining the error to a ticketing system, which may be accessible through the interface 1731.

Figure 18:
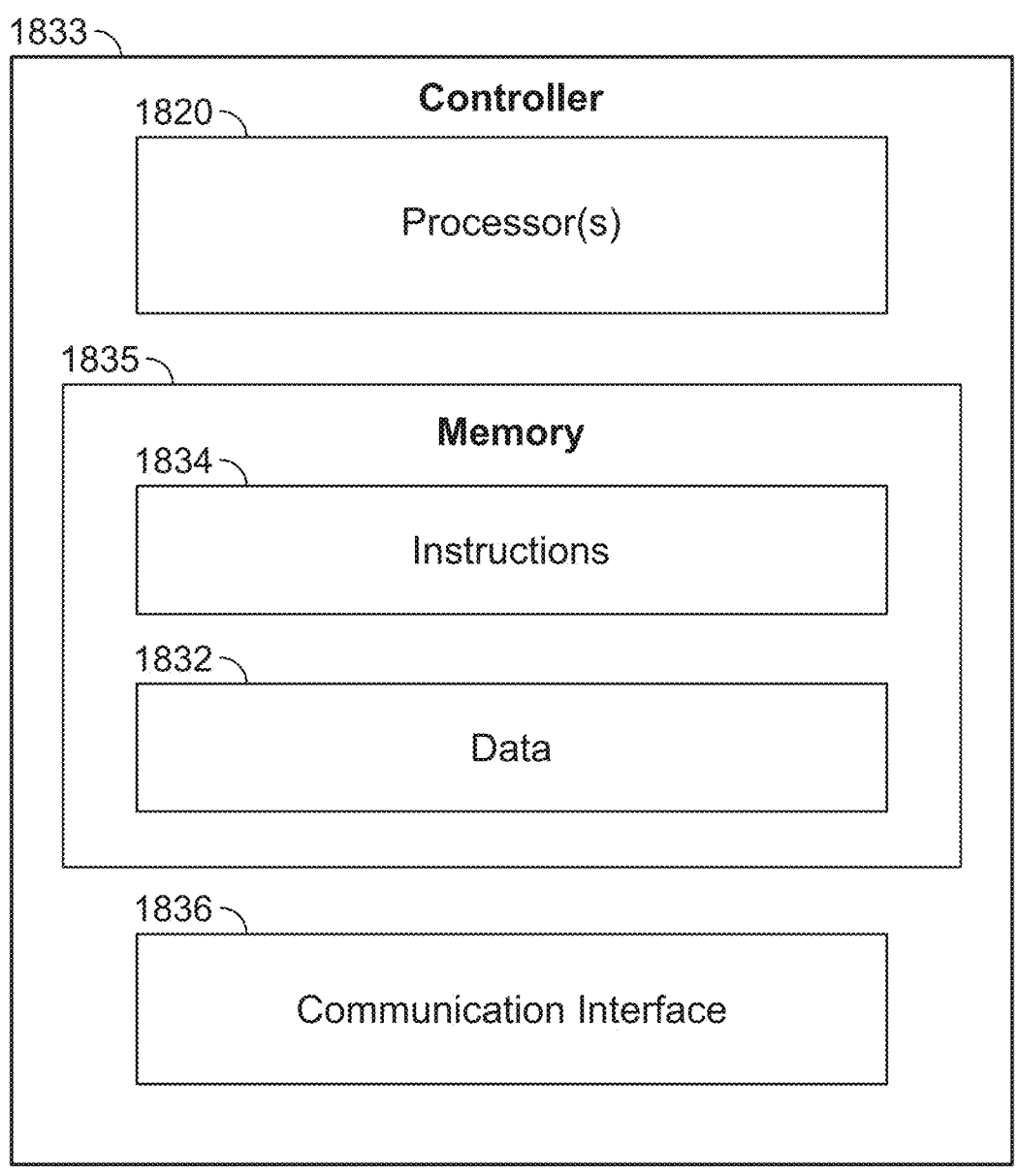
FIG. 18 illustrates an example controller, according to aspects of the disclosure.

FIG. 18 illustrates an example controller 1833 which may be compared to controller 133, used to operate the robotic system 100. The controller 1833 includes one or more processors 1820, memory 1835 and other components typically present in controllers. Memory 1835 can store information accessible by the one or more processors 1820, including instructions 1834 that can be executed by the one or more processors 1820.

Memory 1835 can also include data 1832 that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions 1834 can be any set of instructions to be executed directly, such as machine code, or indirectly, such as scripts, by the one or more processors. In that regard, the terms "instructions," "application," "steps," and "programs" can be used interchangeably herein. The instructions can be stored in object code format for direct processing by a processor, or in any other controller language, including scripts or collections of independent source code modules that are interpreted on demand or compiled in advance. Functions, methods, and routines of the instructions, such as operating the components of the robotic system 101, monitoring the operating status of components, etc., as further described herein.

Data 1832 may be retrieved, stored, or modified by the one or more processors 1820 in accordance with the instructions 1834. For instance, although the subject matter described herein is not limited by any particular data structure, the data can be stored in computer registers, in a relational database as a table having many different fields and records, or XML documents. The data can also be formatted in any controller-readable format such as, but not limited to, binary values, ASCII, or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 1820 can be any conventional processors, such as a commercially available CPU. Alternatively, the processors can be dedicated components such as an application specific integrated circuit ("ASIC") or other hardware-based processor. Although not necessary, one or more of controllers 1833 may include specialized hardware components to perform specific computing processes.

The controller 1833 may include a communication interface 1836 enabling communication between the controller 1833 and other components, such as the interface 1731, an order system, etc. The controller may communicate over a network and with other devices using various protocols and systems, such that the network can be part of the Internet, World Wide Web, specific intranets, wide area networks, or local networks. The network can utilize standard communication technologies and protocols, such as Near Field Communication (NFC), Ethernet, WiFi, HTTP, protocols described in IEEE 302.33, cellular technology (such as GSM, CDMA, UMTS, EV-DO, WiMAX, LTE, etc.) protocols that are proprietary to one or more companies, and various combinations of the foregoing. Although certain advantages are obtained when information is transmitted or received as noted above, other aspects of the subject matter described herein are not limited to any particular manner of transmission of information.

Although FIG. 18 functionally illustrates the processor, memory, and other elements as being within the same controller, the processor, memory, and other such devices may actually comprise multiple processors and/or memories that may or may not be stored within the same physical housing. Accordingly, references to a processor, controller, or memory will be understood to include references to a collection of processors, controllers, or memories that may or may not operate in parallel. Yet further, although some functions described below are indicated as taking place on a single controller having a single processor, various aspects of the subject matter described herein can be implemented by a plurality of controllers, for example, in the "cloud." Similarly, memory components at different locations may store different portions of instructions 1834 and collectively form a medium for storing the instructions. Various operations described herein as being performed by a controller may be performed by a virtual machine or other computing device. By way of example, instructions 1834 may be specific to a first controller, but the relevant operations may be performed by a second controller or a hypervisor that emulates the first controller. The operations may also be performed by a container, e.g., a computing environment that does not rely on an operating system tied to specific types of hardware.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A robotic system comprising:
a conveyance system;
a bowl dispenser configured to deposit bowls onto the conveyance system;
one or more food dispensers configured to deposit one or more ingredients into the bowls;

one or more condiment dispensers configured to deposit one or more condiments into the bowls;
a lidder configured to position lids atop the bowls; and
a bagger configured to place the bowls into bags.

2. The system of claim 1, wherein the conveyance system includes a plurality of magnetic carriages configured to be magnetically attached to a plurality of carrier sleds.

3. The system of claim 2, wherein the plurality of magnetic carriages are configured to traverse a path through the robotic system such that the attached plurality of carrier sleds traverse the path.

4. The system of claim 2, wherein each carrier sled of the plurality of carrier sleds includes an insert and is configured to receive a single bowl from the bowl dispenser.

5. The system of claim 2, wherein each carrier sled of the plurality of carrier sleds includes a load cell configured to measure the weight of a bowl deposited within the respective carrier sled and wirelessly transmit the measured weight.

6. The system of claim 1, wherein the bowl dispenser is configured to deposit a single bowl onto the conveyance system at a time, wherein each of the single bowls is retrieved from a stack of bowls stored within the bowl dispenser.

7. The system of claim 6, wherein the bowl dispenser includes a reader configured to receive weight measurements.

8. The system of claim 1, wherein each of the one or more food dispensers stores an ingredient within a hopper.

9. The system of claim 8, wherein each of the one or more food dispensers are configured to maintain the one or more ingredients at preset temperatures within respective hoppers.

10. The system of claim 9, wherein a first portion of the one or more food dispensers are connected to a chiller, steamer, and/or heater.

11. The system of claim 9, wherein each of the one or more food dispensers include:
one or more augers, and
a hopper outlet,
wherein the one or more augers direct the ingredient within the respective hopper out of the hopper through the hopper outlet into a bowl on the conveyance system.

12. The system of claim 1, wherein the one or more ingredients include singular foods or food preparations.

13. The system of claim 1, wherein the one or more condiment dispensers are configured to store condiments within cups and the cups are stored in columns, wherein each column stores a particular condiment type.

14. The system of claim 13, wherein the columns form a carousel and condiments are deposited into bowls from the bottom of the columns through an actuator door.

15. The system of claim 1, wherein the lidder stores a plurality of lids in a stack such that the top of the lid is facing downwards towards the conveyance system.

16. The system of claim 15, wherein the lidder comprises an end effector attached to an arm, wherein the end effector is configured to grasp a lid from a bottom of the stack and, wherein, after grasping the lid, the arm is configured to move the end effector downwards towards the conveyance system.

17. The system of claim 16, wherein the arm is configured to rotate the end effector 180 degrees, such that the bottom of the top of the lid is facing upwards towards the stack of lids, and wherein the arm moves the end effector towards a bowl positioned on the conveyance system until the lid is on top of the bowl, whereupon the end effector is configured to release the lid.

18. The system of claim 1, wherein the bagger is configured to place bowls from the same order into a bag.

19. The system of claim 1, wherein the bagger is configured to seal and label bags.

20. The system of claim 19, wherein the bagger is configured to place sealed and labeled bags onto a conveyor.

\* \* \* \* \*